US 11,781,751 B2

(12) United States Patent
Van Otten et al.

(10) Patent No.: US 11,781,751 B2
(45) Date of Patent: *Oct. 10, 2023

(54) COMBUSTION SYSTEM COMPRISING AN ANNULAR SHROUD BURNER

(71) Applicant: Jupiter Oxygen Corporation, Des Plaines, IL (US)

(72) Inventors: Brydger Van Otten, Herriman, UT (US); Steven Harold Krimsky, Wilmette, IL (US); Kevin Davis, Salt Lake City, UT (US); Andrew Paul Chiodo, Sandy, UT (US)

(73) Assignee: Jupiter Oxygen Corporation, Des Plaines, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/952,737

(22) Filed: Nov. 19, 2020

(65) Prior Publication Data

US 2021/0190315 A1 Jun. 24, 2021

Related U.S. Application Data

(63) Continuation of application No. 16/722,010, filed on Dec. 20, 2019, now Pat. No. 10,845,052.

(51) Int. Cl.
*F23N 1/02* (2006.01)
*F23B 30/00* (2006.01)
*F23K 3/02* (2006.01)

(52) U.S. Cl.
CPC ............. *F23N 1/02* (2013.01); *F23B 1/34* (2013.01); *F23B 7/007* (2013.01); *F23K 3/02* (2013.01);
(Continued)

(58) Field of Classification Search
CPC .... F23N 1/02; F23N 2239/02; F23N 2241/04; F23B 1/34; F23B 7/007; F23K 3/02; F23K 2203/201; F23K 2900/01041
See application file for complete search history.

(56) References Cited

U.S. PATENT DOCUMENTS 4,241,673 A * 12/1980 Smith ................. F23K 3/02
431/2
5,123,836 A   6/1992 Yoneda et al.
(Continued)

FOREIGN PATENT DOCUMENTS

| EP | 2659186 B1 | 6/2019 |
| KR | 20190012994 A | 2/2019 |
| WO | 8902051 A1 | 3/1989 |

*Primary Examiner* — Alfred Basichas
(74) *Attorney, Agent, or Firm* — Katten Muchin Rosenman LLP

(57) ABSTRACT

The present disclosure is directed to systems and methods for high flame temperature oxy-combustion that enables the capture of $CO_2$ cost effectively. One part of the presently disclosed subject matter comprises an annular shroud burner which utilizes a supply of undiluted oxygen and minimal flue gas recycle to generate a high flame temperature to maximize efficiency. The annular shroud burner may deliver oxygen into a combustion zone where mixing of the oxygen and a stream of fuel occurs. Flue gas recycled from the exit of the combustion system serves the dual purpose of conveying the coal into the reaction zone, as well as providing local cooling and protection from high incident heat fluxes through the novel shroud cooling design. The annular shroud burner may be configured to produce an axial jet flame that controls the rate of mixing of oxygen and fuel, thereby extending the heat release. Oxygen and coal may be mixed in a ratio such that peak flame temperatures exceed 4,500°

(Continued)

F. (2,482° C.) while the flow of recycled flue gas is regulated to control flame temperature and protect burner components and near-burner surfaces.

14 Claims, 19 Drawing Sheets

(52) U.S. Cl.
CPC .................. *F23K 2203/201* (2013.01); *F23K 2900/01041* (2013.01); *F23N 2239/02* (2020.01); *F23N 2241/04* (2020.01)

(56) References Cited

U.S. PATENT DOCUMENTS

| | | |
|---|---|---|
| 5,199,866 A | 4/1993 | Joshi et al. |
| 5,256,058 A | 10/1993 | Slavejkov et al. |
| 5,411,394 A | 5/1995 | Beer et al. |
| 5,743,723 A | 4/1998 | Iatrides et al. |
| 6,233,974 B1 | 5/2001 | Anderson et al. |
| 6,436,337 B1 | 8/2002 | Gross |
| 6,596,220 B2 | 7/2003 | Gross |
| 6,843,185 B1 | 1/2005 | Taylor |
| 6,938,560 B2 | 9/2005 | Okazaki et al. |
| 7,028,622 B2 | 4/2006 | Taylor |
| 8,505,496 B2 | 8/2013 | Douglas et al. |
| 8,584,604 B2 | 11/2013 | Yamada et al. |
| 8,689,710 B2 | 4/2014 | Slavejkov et al. |
| 9,243,799 B2 | 1/2016 | D'Agostini et al. |
| 9,353,945 B2 | 5/2016 | Gross et al. |
| 9,513,001 B2 | 12/2016 | Lou et al. |
| 10,161,312 B2 | 12/2018 | Huntington et al. |
| 2005/0191590 A1 | 9/2005 | Boulanov et al. |
| 2006/0199119 A1 | 9/2006 | Abbasi et al. |
| 2010/0077944 A1 | 4/2010 | Slavejkov et al. |
| 2010/0081098 A1 | 4/2010 | D'Agostini et al. |
| 2010/0282185 A1 | 11/2010 | Sanchez-Molinero et al. |
| 2012/0192773 A1 | 8/2012 | Satchell, Jr. et al. |
| 2017/0198905 A1 | 7/2017 | D'Agostini et al. |
| 2019/0170348 A1 | 6/2019 | Ben-Mansour et al. |
| 2022/0325888 A1* | 10/2022 | Van Otten ................ F23D 1/04 |

* cited by examiner

COMBUSTION SYSTEM COMPRISING AN ANNULAR SHROUD BURNER

CROSS-REFERENCE TO RELATED APPLICATIONS

This application is a continuation application of U.S. application Ser. No. 16/722,010 filed Dec. 20, 2019, which is herein incorporated by reference in its entirety for all purposes.

TECHNICAL FIELD

The present disclosure relates to methods and systems for combustion and carbon capture, more particularly, methods and systems involving high flame temperature oxy-combustion of fuel and the efficient capture of carbon dioxide.

BACKGROUND

Fossil fuels are the main source of energy in the world today, particularly in the electrical power generation, industrial and transportation industries. However, due to the large $CO_2$ production associated with fossil fuel use, it is also considered by many as a major contributor to global warming. One of these fossil fuels is coal, where the future use of coal as a fuel for power generation and industrial applications depends on new economical technologies being made available to capture and store the $CO_2$ emitted as a product of the combustion process. These carbon capture technologies are commonly referred to as carbon capture and storage (CCS) and carbon capture utilization and storage (CCUS).

Some of the available technologies include air-fueled and oxy-fueled combustion technologies. In the case of air-fueled combustion (air comprises about 79% nitrogen and 21% oxygen), $NO_x$ and other greenhouse gases such as $CO_2$ and $SO_2$ are produced as a result of the combustion process. The higher percentage of impurities for air-fueled combustion makes carbon capture (such as CCS and CCUS) more complicated and costly than that of oxy-fueled combustion. In addition to this disadvantage, air-fueled combustion suffers from lower fuel efficiency due to the amount of fuel required to heat the nitrogen present in the air.

A more advantageous system is the oxy-fuel combustion system (or oxy-combustion). In the case of oxy-combustion, oxygen that is >95% pure is used as the oxidant in the combustion process in lieu of air. The use of high purity oxygen results in a significantly lower percentage of impurities and higher concentrations of $CO_2$, and $H_2O$, thereby making processes such as CCS and CCUS more cost effective than that of air-fueled combustion. The $CO_2$ and $H_2O$ can easily be separated and the $CO_2$ purified in a carbon purification unit (CPU) leaving high purity $CO_2$ that can be recycled, stored, or utilized as a valuable commodity as part of the CCS or CCUS processes. This reduces the amount of greenhouse gases produced.

However, this process requires pure oxygen ($O_2$), which is often obtained via cryogenic distillation. Cryogenic distillation is a very mature process that has been operational since the 1930s, but is still an expensive process. In addition to an increased expense, traditional oxy-combustion suffers from other deficiencies, such as high capital costs, air ingress and the associated higher impurities, high oxygen requirements, and lower carbon capture, utilization, and sequestration of $CO_2$.

Regardless of the drawbacks associated with traditional oxy-combustion of fuels, it is still an improvement over air-fueled combustion. Thus, there is a desire to replace the air-fuel combustion burners present in the boilers and process heaters in existing fuel processing plants with the more environmentally friendly oxy-combustion burners.

Generally, the systems in the existing fuel processing plants were configured to provide optimal performance while limiting negative results associated with air-fueled combustion burners. Thus, replacing one burner with another is not easily accomplished, much less replacing an air-fueled with oxy-fueled combustion process. Potential drawbacks associated with this type of change include a significant change in the heat transfer between the various systems as well as an increased likelihood of component damage due to differing heating characteristics, stream flows, and stream characteristics. One reason for this difficulty is the fact that an oxy-combustion burner will produce a hotter flame temperature than a traditional air-fuel burner. For example, when an existing air-fueled combustion burner is replaced with an oxy-combustion burner, the peak temperature will increase, thus increasing the amount of heat transfer (heat flux) to the components surrounding the oxy-combustion burner. This requires modification of the existing parts of the plant, a process which is both time consuming and extremely expensive.

Reports on prior attempts to design an oxy-coal burner appropriate for application to different systems comprise overly complex designs (See U.S. Pat. Nos. 8,584,605, 7,028,622, and 6,843,185). This partly results from the nature of oxy-combustion, which involves burning of fuel using pure oxygen as the oxidant rather than air. Since heat from combustion does not go toward the heating of nitrogen in the air, flame temperatures with oxy-combustion increase dramatically. Still others have described oxy-combustion technology that uses minimal FGR and produces high temperature flames (see Gross in U.S. Pat. Nos. 6,436,337 and 6,596,220). However, the burners described in these publications have the potential to cause damage to the systems surrounding the oxy-coal burner due to the nature of their designs.

Others have tempered the oxy-combustion flame temperature by creating a synthetic air stream consisting of a mixture of oxygen and flue gas recycle (FGR) resulting in a lower flame temperature in addition to the use of a precombustor (see U.S. Pat. Nos. 9,243,799, 8,689,710). While the burners described in U.S. Pat. Nos. 9,243,799 and 8,689,710 may operate at a much lower flame temperature and therefore may not necessarily cause damage to the system surroundings, they have other design and operational challenges. Large volumes of FGR may require additional energy to heat prior to entering the furnace (similar to an air preheater). Air ingress may also increase as FGR increases. More FGR leads to a large volume of flue gas leaving the furnace, which necessitates increased downstream equipment size (e.g. air pollution control devices, ductwork, fans, carbon capture and purification equipment).

In sum, the existing patents referenced above do not have burner design characteristics or operational approaches suitable to effectively utilize and regulate heat flux to the burner components and furnace walls when utilizing a high flame temperature oxy-combustion approach.

As such, there is a need for an oxy-combustion firing system that addresses the deficiencies of the prior art, namely the development of a burner design capable of efficiently and cost effectively producing and sustaining the high flame temperature oxy-combustion conditions for coal-firing. Further needed is an oxy-combustion firing system that is capable of replacing traditional air-fueled combustion burners in existing fuel combustion systems while simultaneously preventing damage to burner components and furnace internal surfaces arising from high heat fluxes.

SUMMARY

In one aspect, the subject matter described herein is directed to a high flame temperature oxy-combustion firing system. More specifically, in an embodiment the high flame temperature oxy-combustion firing system is an annular shroud burner comprising a quadruple concentric burner design with an $O_2$ annulus in the center, followed by a fuel annulus for coal, then an $O_2$ annulus, and finally an outer flue gas recycle (FGR) annulus. Further positioned outside the FGR annulus is a quarl.

The design and method of operating the annular shroud burner allow generation of a high temperature flame, localized toward the center of the combustion area, with a shroud of cooler gas on the periphery of the combustion area. Thus, the annular shroud burner provides local cooling while simultaneously maintaining the high flame temperature characteristics of the burner, thereby maximizing efficiency and flame stability.

In another embodiment, the annular shroud burner having a quadruple concentric burner design has a design which comprises a first, second, third, and fourth conduit wherein each conduit separately injects a first, second, third, and fourth flow into a first, second, third, and fourth annulus, wherein the first flow comprises a first source of oxygen,
the second flow comprises a mixture of fuel and a carrier gas for transporting the fuel,
the third flow comprises a second source of oxygen,
the fourth flow comprises FGR,
wherein at the center of the annular shroud burner there is an igniter, and positioned outside the fourth annulus is a quarl.

In another embodiment is a method of combusting fuel, the method comprising:

providing an annular shroud burner,
supplying a first $O_2$ stream through a first conduit to a first annulus,
supplying a mixture of fuel and carrier through a second conduit to a second annulus,
supplying a second $O_2$ stream through a third conduit to a third annulus,
supplying FGR through a fourth conduit to a fourth annulus, and
igniting the flame using an igniter located at the center of the annular shroud burner.

In another embodiment is a high flame temperature oxy-combustion system, comprising:

at least one annular shroud burner,
a furnace for combusting,
an air separation unit,
at least one conduit, and
a control system, wherein the annular shroud burner is configured to provide a peak flame temperature of at least 4,000° F. (2,204° C.) with a heat profile signature similar to that depicted in FIG. 4, such that the radiant heat and potential damage to systems surrounding the annular shroud burner is minimized.

In another embodiment is a method of operating the high flame temperature oxy-combustion system, wherein the method comprises:

supplying a fuel, carrier, and substantially pure oxygen to the annular shroud burner, burning the fuel, carrier, and substantially pure oxygen to issue a flame, wherein the flame has a radiant heat profile signature similar to that depicted in FIG. 4, heating water in the boiler with the high flame temperature oxy-combustion annular shroud burner to convert water into steam.

These and other aspects are more fully described below.

BRIEF DESCRIPTION OF THE FIGURES

FIG. 1A depicts the general configuration of the annular shroud burner. FIG. 1B depicts four specific areas of the annular shroud burner, specifically the center $O_2$ port, fuel annulus, outer $O_2$ annulus, and FGR annulus for localized cooling.

DETAILED DESCRIPTION

Figure 1A:
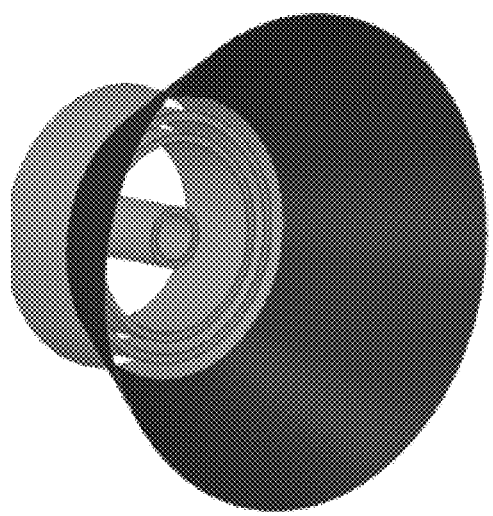
FIGS. 1A and 1B depict the annular shroud burner.

The subject matter disclosed herein includes a high flame temperature oxy-coal firing system designed to combust coal using undiluted oxygen and minimal flue gas recycle (FGR). In an embodiment, the system comprises a quadruple burner capable of producing an axial jet flame with a peak temperature in excess of 4,000° F. (2,204° C.). In a further embodiment, the amount of FGR distributed around the combustion zone may be regulated to ensure optimal cooling and shielding from the high temperature flame. This FGR distribution, referred herein as a shroud, surrounds the areas of peak flame temperature. This shroud functions to prevent damage to burner components and near-burner surfaces from extreme temperatures and heat fluxes while minimizing the impact on the peak flame temperature.

In another embodiment, an annular shroud burner system employing undiluted directed oxygen in combination with a complex mixing strategy is effective at producing a stable high flame temperature. Application of this technology to various systems, such as power production by steam generation, leads to a system with increases in efficiency, lower capital costs, and improved $CO_2$ capture and sequestration. The technology may also be used in greenfield applications and/or as a retrofit to existing steam generating power plants. The advantages of the technology are not limited to the power generation industry. Enhancing combustion of coal with pure oxygen has the potential to benefit any industry that uses the combustion of coal or other fossil fuels as a fuel source.

The present invention can be understood more readily by reference to the following detailed description of the invention and the Examples included therein.

Before the present systems, devices, and/or methods are further disclosed and described, it is to be understood that they are not limited to specific methods unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example systems, devices, and methods are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

A. Definitions

Listed below are definitions of various terms used to describe this invention. These definitions apply to the terms as they are used throughout this specification, unless otherwise limited in specific instances, either individually or as part of a larger group.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. Further, as used herein, the term "about," when referring to a value, is meant to encompass variations of, in some embodiments ±20%, in some embodiments ±15%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller ranges is also encompassed, subject to any specifically excluded limit in the stated range. Where the stated range includes one or both of the limits, ranges excluding either or both of those included limits are also included.

As used herein, the terms "optional" or "optionally" mean that the subsequently described event or circumstance can or cannot occur, and that the description includes instances where said event or circumstance occurs and instances where it does not.

The term "comprising" (and its grammatical variations) as used herein is used in the inclusive sense of "having" or "including" and not in the exclusive sense of "consisting of"

As used herein, the term "fuel" refers to any fuel suitable for combustion purposes. For example, the disclosure may be used with many types of fuels, including but not limited to: natural gas, hydrogen, refinery off gas, refinery fuel gas, blast furnace gas, propane, fuel oils, coal (such as peat, anthracite, semi-anthracite, super anthracite, bituminous, sub-bituminous, semi-bituminous, and lignite coals); tar; bitumen; petroleum coke; paper mill sludge solids and sewage sludge solids; wood; peat; grass; and combinations and mixtures of all of those fuels.

As used herein, the term "oxygen" refers to an oxidizer with an $O_2$ concentration greater than about 30 mol %; typically greater than about 90 mol % and includes oxygen FGR. As used herein, the term oxy/coal combustion refers to coal combustion in oxygen, the term air/coal combustion refers to coal combustion in air, the term oxy/fuel combustion refers to fuel combustion in oxygen, and the term air/fuel combustion refers to fuel combustion in air.

As used herein, the term "$O_2$ stream" refers to a stream of oxygen ($O_2$) that is at least 90 mol % oxygen.

As used herein, the term "substantially pure oxygen" refers to the degree of purity of oxygen as needed to provide the correct ratio of fuel and oxygen for the desired burn and by-products without departing from the scope of the present invention. Non-limiting examples of substantially pure oxygen are 90% or 99% pure.

As used herein, the term "combustion fluid" refers to a fluid formed from and/or mixed with the products of combustion, which may be utilized for radiant and convective heat transfer. The term is not limited to the products of combustion and may include fluids mixed with or otherwise traveling through at least a portion of combustion system.

As used herein, the term "recycled flue gas" or "RFG" refers to fluid exiting at any suitable location along (including the end) the convective section that is recirculated to any portion of the system. If desired, oxygen can be added to the RFG at any suitable location (e.g., the RFG can comprise up to 30 mole % $O_2$ prior to being introduced into the burner and/or precombustor).

As used herein, the term "flue gas recycle" or "FGR" refers to a configuration permitting the combustion fluid to be recycled into recycled flue gas. While any suitable flue gas source can be employed (including, without limitation, flue gas from an adjoining or a distinct process), typically the flue gas comprises products of combustion from usage of the inventive system.

As used herein, the term "precombustor" refers to an apparatus where burner streams are mixed and ignited prior to entering the burner or furnace. If present, the precombustor may be physically located before a burner. Examples of such precombustors are described in U.S. Pat. No. 9,243,799.

As used herein, the terms "conduit" or "pipe" are used interchangeably and refer to a passageway for conveying fuel, an $O_2$ stream, or other material from one area to another.

B. Annular Shroud Burner a. Burner Design

Figure 1B:
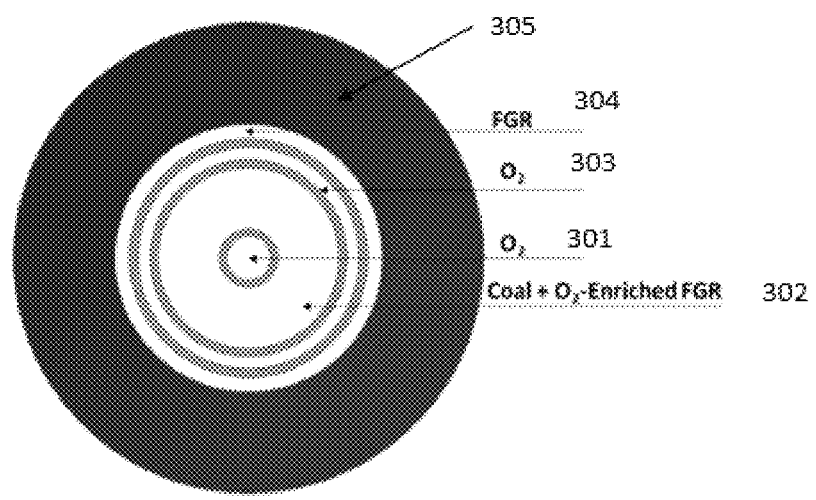

As disclosed herein is a high flame temperature oxy-combustion burner, referred to herein as an annular shroud burner. Turning to the figures, one embodiment of the annular shroud burner is depicted in FIGS. 1A and 1B. More specifically, FIG. 1B shows the annular shroud burner with a quadruple concentric burner design with an $O_2$ inner annulus 301, followed by a fuel annulus for coal 302, then an $O_2$ outer annulus 303, and finally an outer flue gas recycle (FGR) annulus 304. The outer FGR annulus 304 provides local cooling while minimizing negative impacts from the high temperature flame. These negative impacts can include an alteration in flame shape or temperature. In an embodiment, the FGR annulus 304 creates a stream of gas, referred to herein as a shroud. The annular shroud burner also comprises a quarl 305.

The quarl 305 provides a key surface for diffusion of heat during the combustion process. In an embodiment, the quarl is designed for high temperature operations and penetrates a furnace wall through which fuel and oxidant are injected. The quarl may be a diverging conical shape that extends from the burner face to the furnace interior wall. The shape of the quarl allows for aerodynamic flame stabilization through recirculation zones. In an embodiment, the quarl provides a surface for the diffusion of heat, resulting in reduced heat flux to near-burner surfaces. In an embodiment, the quarl provides additional protection of surrounding materials from the high flame temperatures achieved with the annular shroud burner.

As disclosed in more detail herein, the multi-register annular shroud burner allows the heat release and heat flux to be stretched out to avoid damage to near-burner surfaces while still producing flame stability. Specifically, the outer FGR annulus 304 is capable of providing adequate cooling to the burner and near-burner surfaces while keeping surface temperatures within tolerable limits of materials conventionally used in an industrial furnace. This annular shroud burner thus provides high flame temperatures exceeding 4,000° F. (2,204° C.) while simultaneously preventing damage to burner components and furnace internal surfaces arising from high heat fluxes.

A resultant functional aspect of the annular shroud burner is that it extracts a maximum amount of energy (in the form of heat transfer from the combustion of products) from the combustion process, without adversely affecting the high flame temperature or systems surrounding the burner. Thus, maximum practicable use of the higher flame temperatures is achieved. For example, the annular shroud burner provides a considerably larger proportion of heat transfer from the combustion products to the desired areas (such as boiler tubes and/or working fluid) without unwanted radiant heat flux to undesired areas, when compared to more traditional burner designs.

Other advantages observed with the currently disclosed annular shroud burner include: ease of introduction of fuel, oxygen and flue gas; simpler design than prior burner designs; improved ease of control of many properties, such as flow rate and source of gas; high temperature flame that improves radiant heat transfer and efficiency; a novel shroud cooling design to minimize flame temperature impacts for maximizing efficiency; reduction in radiant heat flux; improved flame characteristics such as peak flame temperature, flame shape and stability; and the ability to use reclaimed flue gas.

It is known that as temperature increases, the radiant heat transfer is proportional to $T^4$, where T=the flame temperature. Thus, as described in U.S. Pat. No. 9,353,945, the radiant heat transfer increases with the increase of flame temperature, thereby increasing overall system efficiency.

Figure 2A:
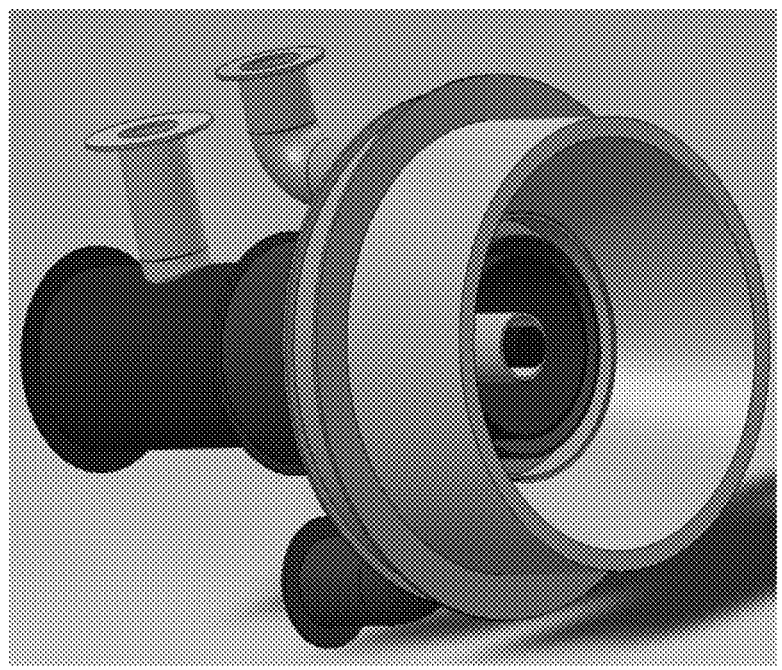
FIGS. 2A-2C depict different aspects of the annular shroud burner.
Figure 2B:
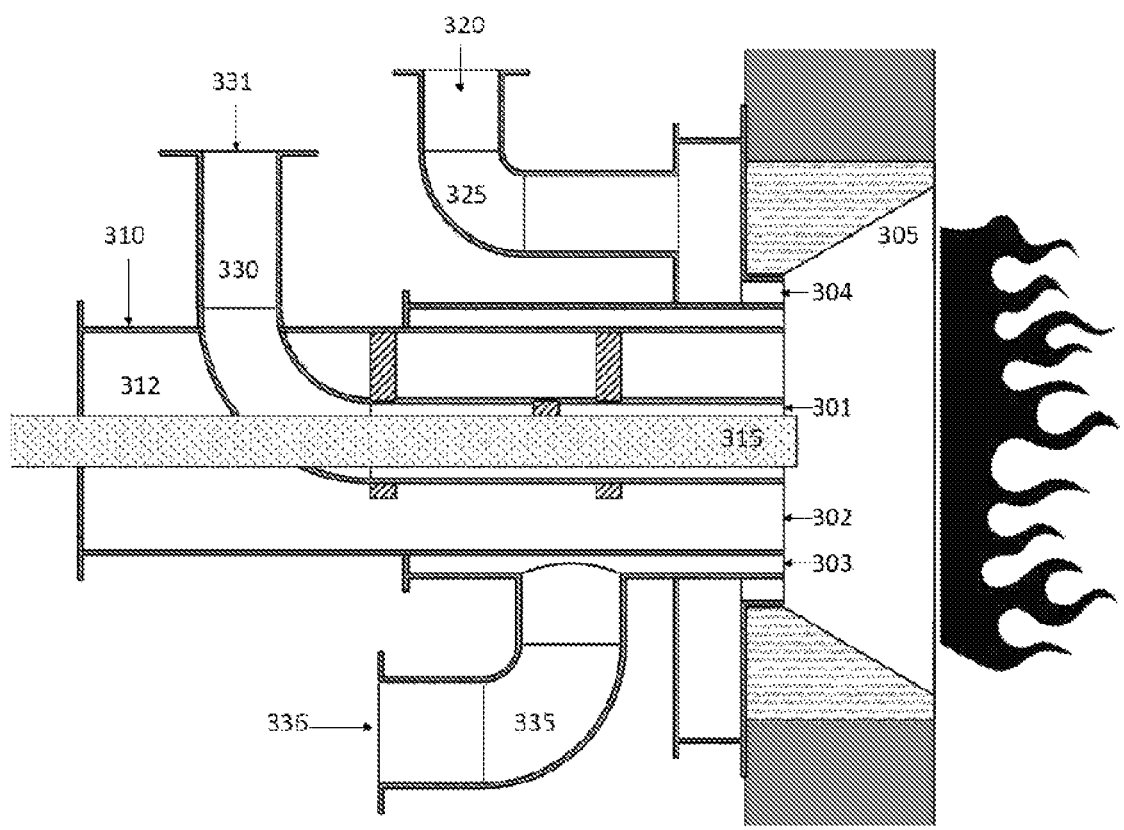
Figure 2C:
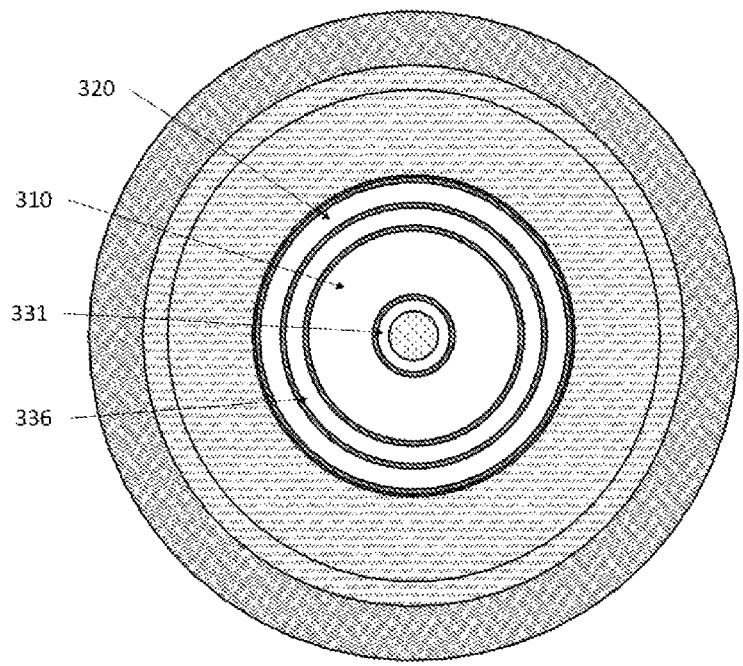

In an embodiment, as schematically represented in FIGS. 2A and 2B, is the annular shroud burner. FIG. 2A shows an embodiment of the annular shroud burner with four registers. FIG. 2B shows the same annular shroud burner with fuel 310, FGR 320, and $O_2$ 331 and $O_2$ 336. Fuel 310 flows through fuel conduit 312 to fuel annulus 302. $O_2$ 331 flows through conduit 330 to $O_2$ inner annulus 301. $O_2$ 336 flows through conduit 335 to $O_2$ outer annulus 303. FGR 320 flows through conduit 325 to FGR annulus 304. FIG. 2C shows a front view of the annular shroud burner with the exit points for the fuel 310, the FGR 320, and $O_2$ 331 and $O_2$ 336.

Figure 3:
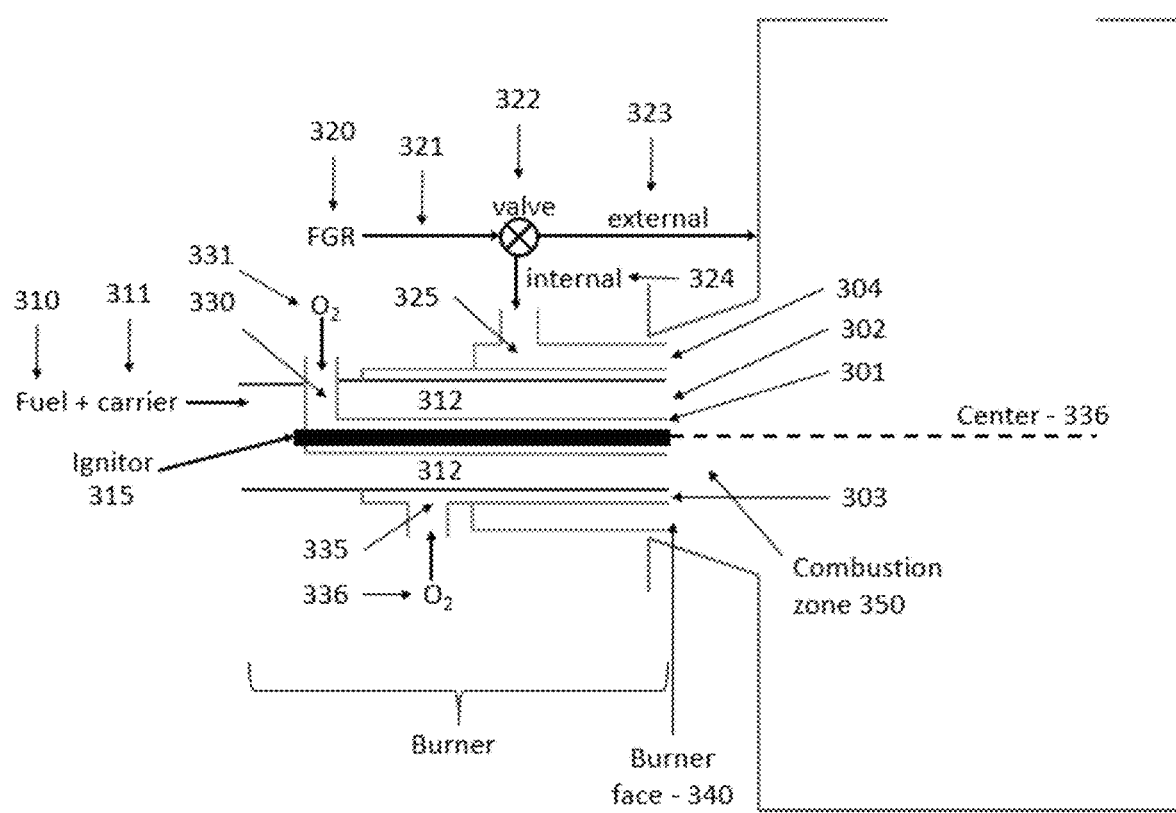
FIG. 3 shows a process flow diagram of the high flame temperature oxy-fired system.

In an embodiment, the annular shroud burner flow schematic is depicted in FIG. 3. An ignitor 315 is located at the center of the burner. In an embodiment, the fuel 310, such as coal, is combined with a carrier 311 and introduced to the burner through conduit 312, which feeds to the inner annulus 301. In an embodiment, carrier 311 is recycled flue gas. In a further embodiment, the recycled flue gas is treated recycle flue gas, where treated recycle flue gas has been dehydrated and impurities removed as part of the $CO_2$ capture process. In a separate portion of the annular shroud burner, FGR 320 is fed through an FGR conduit 321 which is fed through conduit 325 to FGR annulus 304. In a further embodiment, oxygen is mixed with the flue gas.

In an embodiment, an $O_2$ conduit supplies two separate paths. One path feeds an undiluted $O_2$ stream through conduit 330 to $O_2$ inner annulus 301. In the other path, an undiluted $O_2$ stream is delivered through conduit 335 to $O_2$ outer annulus 303 which is immediately outside of fuel conduit 312 (leading to fuel annulus 302). In an embodiment, the $O_2$ streams are derived from the same source. In another embodiment, the $O_2$ streams are derived from alternate sources. In an embodiment, $O_2$ outer annulus 303 is located between fuel annulus 302 and FGR annulus 304. In a preferred embodiment, the $O_2$ streams are on both sides of fuel 310 leading to fuel annulus 302. This configuration provides enhanced flame stability and control. In contrast to a diluted $O_2$ stream, the undiluted $O_2$ streams used in an embodiment allow peak flame temperatures to exceed 4,000° F. (2,204° C.).

In an embodiment, the fuel 310 may be a fossil fuel. Fossil fuels comprise oil, coal, and natural gas. In an embodiment, the fuel 310 may be coal. The coal may be peat, anthracite, semi-anthracite, super anthracite, bituminous, sub-bituminous, semi-bituminous, or lignite coals. As a point of reference, the U.S. coal production in 2010 by coal type is further described. The production by tonnage comprised 45% bituminous, 47% sub-bituminous, 7% lignite, and 0.2% anthracite. The production by total energy was 54% bituminous, 41% sub-bituminous, 4.7 lignite, and 0.3% anthracite. In an embodiment, the fuel is bituminous or sub-bituminous coal.

Fuel, oxygen, and recycled flue gas are connected and supplied to their respective conduits or pipes in accordance with conventional apparatus and methods. Each stream is fed directly into the combustion zone 350 where the fuel reacts with the oxidant and the shroud FGR acts as a temperature shield. When the oxygen and fuel react in the annular shroud burner, the fuel is combusted. The oxygen and fuel reaction can be initiated by heat absorbed from an outside source or by a distinct energy source such as an ignitor or pilot flame. In an embodiment, the oxygen and fuel reaction are initiated by an ignitor 315. In an embodiment, ignitor 315 is located at the center of the annular shroud burner.

In addition to supplying the motive force for fuel transport, the FGR 320 can be directed to the FGR annulus 304, which provides protection to burner internals and near-burner surfaces from the high heat fluxes produced. The inlets for each stream into the furnace are configured such that the flame produced is an axial jet that extends the rate of mixing of the fuel and $O_2$ in the furnace. The resultant heat release profile is extended through elongation compared to other burner designs configured to rapidly mix fuel and oxidant that involve swirl and/or a blunt object. This extended heat release profile provides protection from the intense radiant fluxes created by the high temperature flames.

In a further embodiment, the annular shroud burner comprises a control scheme that individually regulates the flow of fuel, the flow of FGR, and the flow of $O_2$ as required to control the ratio of FGR flow to fuel flow and the ratio of fuel flow to $O_2$ flow.

The flow rate of the $O_2$ streams is controlled such that the flow rate is in the range from about 25 ft/s to about 125 ft/s. In an embodiment the flow rate is in the range from 30 to 110 ft/s, 40 to 90 ft/s, or 50 to 70 ft/s. In an embodiment, the flow rate is greater than about 30 ft/s, 40 ft/s, 50 ft/s, 60 ft/s, 70 ft/s, 80 ft/s, 90 ft/s, or 100 ft/s. In an embodiment, the flow rate is about 30 ft/s, 35 ft/s, 40 ft/s, 45, ft/s, 50 ft/s, 55 ft/s, 60 ft/s, 65 ft/s, 70 ft/s, 75 ft/s, 80 ft/s, 85 ft/s, 90 ft/s, 95 ft/s, 100 ft/s, 105 ft/s, or 110 ft/s.

In an embodiment, the percentage of oxygen in the $O_2$ streams may be at least 90% oxygen. In embodiments, the $O_2$ stream may be at least about 91%, at least about 92%, at least about 93%, at least about 94%, at least about 95%, at least about 96%, at least about 97%, at least about 98%, at least about 99%, at least about 99.5%, at least about 99.6%, at least about 99.7%, at least about 99.8%, or at least about 99.9% oxygen. The $O_2$ stream may contain between 90% to 100%, 95% to 100%, 97% to 100%, 98% to 100%, or 99% to 100% oxygen. In some embodiments, the $O_2$ stream may contain between 91% to 99.5%, between 92% to 99%, between 93% to 98%, or between 94% to 97% oxygen.

The percentage of oxygen in the $O_2$ streams may be adjusted to control the flame temperature. In an embodiment, the use of undiluted $O_2$ streams allows the peak flame temperature of the annular shroud burner to be greater than 4,000° F. In contrast, when a stream of $O_2$ is diluted with other gases or contains less than 90% oxygen, peak flame temperatures of greater than 4,000° F. cannot be obtained.

The flow rate of the primary fuel is controlled such that the flow rate is in the range from about 20 ft/s to about 150 ft/s. In an embodiment the flow rate is in the range from 30 to 125 ft/s, 40 to 100 ft/s, or 50 to 75 ft/s. In an embodiment, the flow rate is greater than about 30 ft/s, 40 ft/s, 50 ft/s, 60 ft/s, 70 ft/s, 80 ft/s, 90 ft/s, 100 ft/s, 110 ft/s, 120 ft/s, 130 ft/s, or 140 ft/s. In an embodiment, the flow rate is about 30 ft/s, 35 ft/s, 40 ft/s, 45, ft/s, 50 ft/s, 55 ft/s, 60 ft/s, 65 ft/s, 70 ft/s, 75 ft/s, 80 ft/s, 85 ft/s, 90 ft/s, 95 ft/s, 100 ft/s, 105 ft/s, 110 ft/s, 115 ft/s, 120 ft/s, 125 ft/s, 130 ft/s, 135 ft/s, 140 ft/s, 145 ft/s, or 150 ft/s. In an embodiment, the flow rate of the fuel stream is directly related to the type of fuel used. In an embodiment, the fuel flow rate may result in a change in position for where the flame originates. In an embodiment, the flame originates at the burner face. In another embodiment, the flame originates at a position moved away from the burner face. When the annular shroud burner is installed in a fuel processing plant and in the vicinity of a boiler, this is seen as the flame origination point moves away from the burner face towards the boiler.

In an embodiment, the percentage of oxygen in the carrier is between 0% and 30% oxygen. In embodiments, the percentage of oxygen may be from 0% to 3%, from 3% to 10%, from 10% to 20%, or from 20% to 30%. In alternate embodiments, the percentage of oxygen is from about 3% to 25%, from about 5% to 20%, from about 10% to 15%, or from 10% to 23.5%. In embodiments, the percentage of oxygen is about 0%, 1%, 2%, 3%, 4%, 5%, 10%, 15%, 20%, 23.5%, 25%, or 30%. In some embodiments, the percentage of oxygen is at least about 1%, at least about 5%, at least about 10%, at least about 15%, at least about 20%, or at least about 23.5%. In an embodiment, the percentage of oxygen is less than about 30%, less than about 23.5%, less than about 20%, less than about 15%, less than about 10%, less than about 5%, less than about 3%, or less than about 1%. The amount of oxygen present has an effect on the target peak flame temperature. In an embodiment, the percentage of oxygen is variable, for example where the percentage of oxygen is at 23.5% for a period of time and then the percentage of oxygen is reduced, wherein such reduction may be to about 0% oxygen.

Use of high purity oxygen (>95%) has several advantages when compared to air fired burners. One is that when placed into a boiler system, the oxy-fuel combustion may allow for the boiler to be physically smaller than a conventional boiler.

That is, because oxygen rather than air is used as the oxidizing agent (combustion agent), the entirety of the oxidizing agent is available for combustion and the volume of gas input to the boiler is less (up to 21% less) than would be needed if air was used as the oxidizing agent. Thus, the boiler could be considerably smaller because substantially high purity oxygen rather than air is used.

The flow rate of the FGR stream 320, with or without additional $O_2$ streams, is controlled such that the flow rate is in the range from about 10 ft/s to about 75 ft/s. In an embodiment, the flow rate is in the range from 10 to 30 ft/s, 30 to 50 ft/s, or 50 to 75 ft/s. In an embodiment, the flow rate is greater than about 10 ft/s, 20 ft/s, 30 ft/s, 40 ft/s, 50 ft/s, or 60 ft/s. In an embodiment, the flow rate is about 10 ft/s, 15 ft/s, 20 ft/s, 25 ft/s, 30 ft/s, 35 ft/s, 40 ft/s, 45 ft/s, 50 ft/s, 55 ft/s, 60 ft/s, 65 ft/s, 70 ft/s, or 75 ft/s.

In an embodiment, the percentage of FGR in the FGR stream 320 may be at least 90%. In embodiments, the FGR may be at least about 91%, at least about 92%, at least about 93%, at least about 94%, at least about 95%, at least about 96%, at least about 97%, at least about 98%, at least about 99%, at least about 99.5%, at least about 99.6%, at least about 99.7%, at least about 99.8%, or at least about 99.9%. The FGR stream may contain between 90% to 100%, 95% to 100%, 97% to 100%, 98% to 100%, or 99% to 100% oxygen. In some embodiments, the FGR stream may contain between 91% to 99.5%, between 92% to 99%, between 93% to 98%, or between 94% to 97%.

In an embodiment, the oxygen to fuel ratios may be varied. This ratio may depend upon the purity of the oxygen supply and the nature of the fuel. For example, in an embodiment where the oxygen is 100% pure, the oxygen/fuel ratio may be about 2:1. Those skilled in the art will understand that the ratios may vary depending on the purity of the fuel and oxygen and the ratios may be adjusted accordingly. In an embodiment, the ratio of oxygen to fuel is about 1:1, about 1.5:1, about 2:1, about 2.5:1, or about 3:1.

The proportion of oxygen to fuel provides a number of advantages. For example, approximately stoichiometric proportions provide for complete combustion of the fuel, thus resulting in substantially smaller volume of impurities, such as $NO_x$ and other noxious emissions. Further, accurately controlling the ratio of oxygen to fuel facilitates complete combustion of the fuel.

In an embodiment, the conduits 312, 325, 330, and 335 may comprise different streams than described above. For example, fuel conduit 312 may comprise an $O_2$ stream rather than a fuel stream. In an alternative embodiment, $O_2$ conduit 330 may comprise a fuel stream. Such examples are not intended to be limiting as feeding alternate streams through the various conduits is possible in the annular shroud burner.

The annular shroud burner disclosed herein provides a design that offers advantages not just in terms of simplicity, but in the uniformity of $O_2$ and FGR distribution. In an embodiment, the design simplifies the delivery of $O_2$ and FGR by replacing individual $O_2$ and FGR ports with annular registers. Thus, in an embodiment, the annular shroud burner may be described as a multi-register axial jet burner which allows the heat release and heat flux to be stretched out to avoid damage to near-burner surfaces while still producing stable flames. Further, the outer annulus 304 of FGR is capable of providing adequate cooling to the burner and near-burner surfaces, thereby keeping surface temperatures within tolerable limits of materials conventionally used in an industrial furnace.

In a further embodiment, the annular shroud burner does not comprise a precombustor.

In an alternate embodiment, FGR may be added into either of the $O_2$ streams.

In a further embodiment, the streams 310, 320, 331, and/or 336 avoid the inclusion of nitrogen associated with air. In embodiments, the streams 310 and 320 can comprise less than about 20% air, less than about 15% air, less than about 10% air, less than about 5% air, or less than about 1% air. In embodiments, the streams 310, 320, 331, and/or 336 comprise about 0% air.

b. Flame Characteristics of the Annular Shroud Burner

A firing system designed to produce flame temperatures more than 4,000° F. (2, 204° C.) must be configured such that it would prevent damage to burner components and furnace internal surfaces arising from high heat fluxes. The currently disclosed annular shroud burner accomplishes this goal by surrounding the high flame temperature areas with a cooler stream of gas, termed the shroud. The presence of the shroud reduces the exposure of surrounding systems to high heat flux and reduces damage when compared to traditional burner designs.

As detailed further herein is heat flux data for undiluted oxygen inputs under oxy-coal combustion conditions. Design considerations for atmospheric oxy-coal systems using directed undiluted oxygen with minimal FGR must include an understanding of appropriate radiant heat transfer profiles as a function of burner aerodynamics.

Described herein are models for accurately predicting heat transfer and surface temperatures in high flame temperature oxy-coal combustion units. Heat transfer and surface temperature are critical parameters on which oxy-coal combustion applications depend. These predictive models allow evaluation of multi-scale experiments coupled with mechanism development and computational fluid dynamics (CFD) modeling. The models are used to characterize and predict flame behavior, heat transfer, ash deposition and ash chemistry during high flame temperature oxy-coal combustion at atmospheric pressure.

The predictive CFD model was used to evaluate burner designs applied to a 30 MWt burner in varied arrangements. In one embodiment, the arrangement comprises a front-wall fired steam boiler equipped with four of these burners. The heat release profile of the annular shroud burner differs from that of burners with discrete ports.

Figure 4:
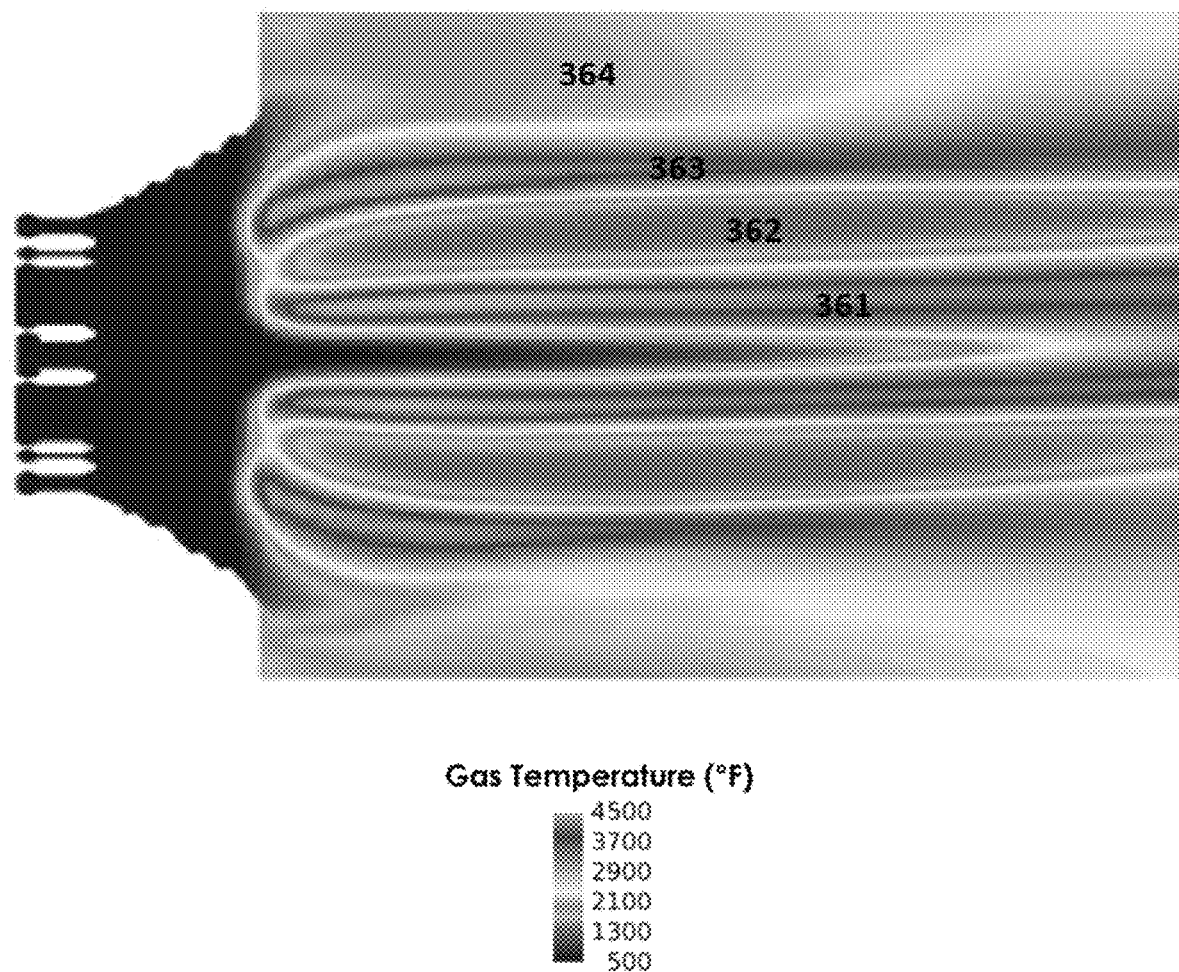
FIG. 4 shows the gas temperature profile for the annular shroud burner with a peak temperature of 4,572° F. (2,522° C.) when firing a bituminous coal.
Figure 5:
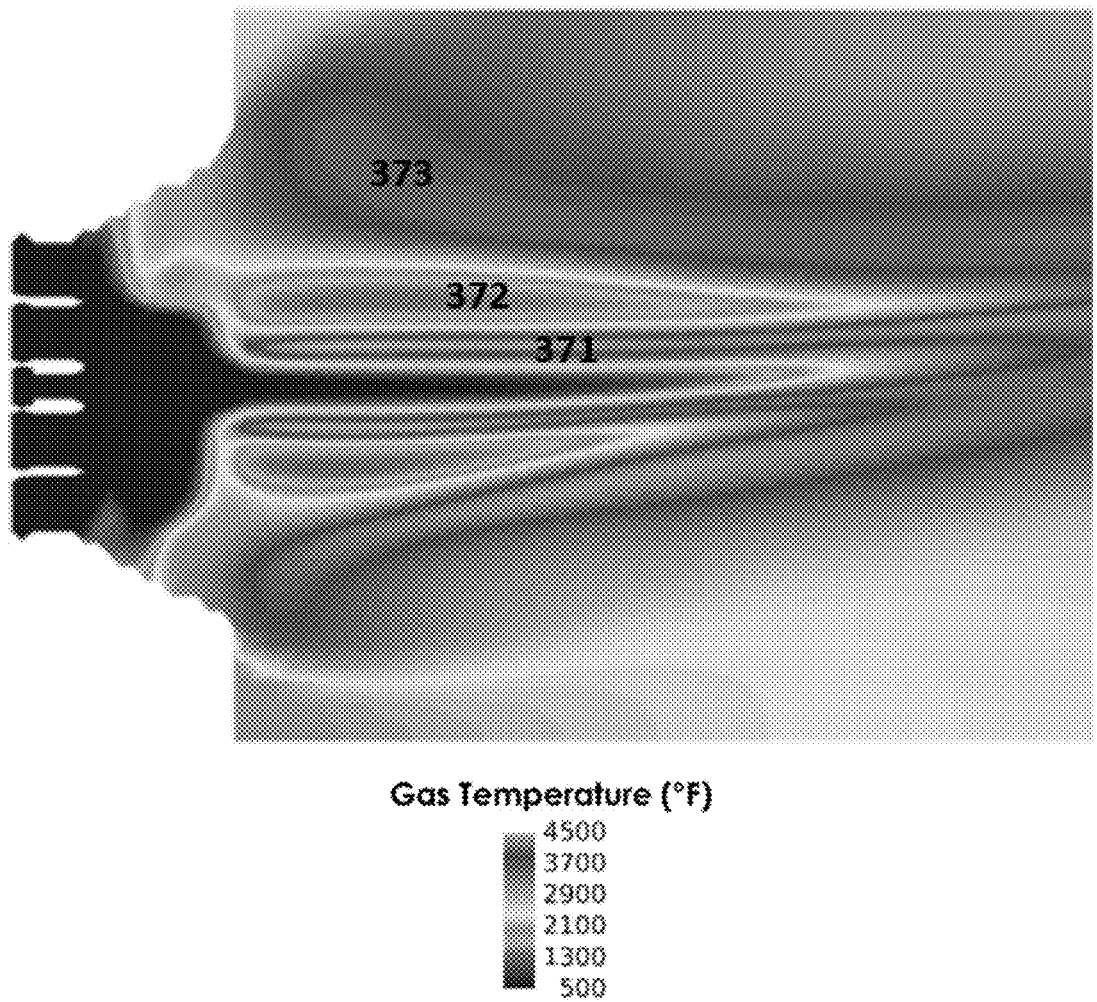
FIG. 5 shows the gas temperature profile for an oxy-combustion burner with discrete $O_2$ ports where the peak temperature is 4,581° F. (2,527° C.).
Figure 6:
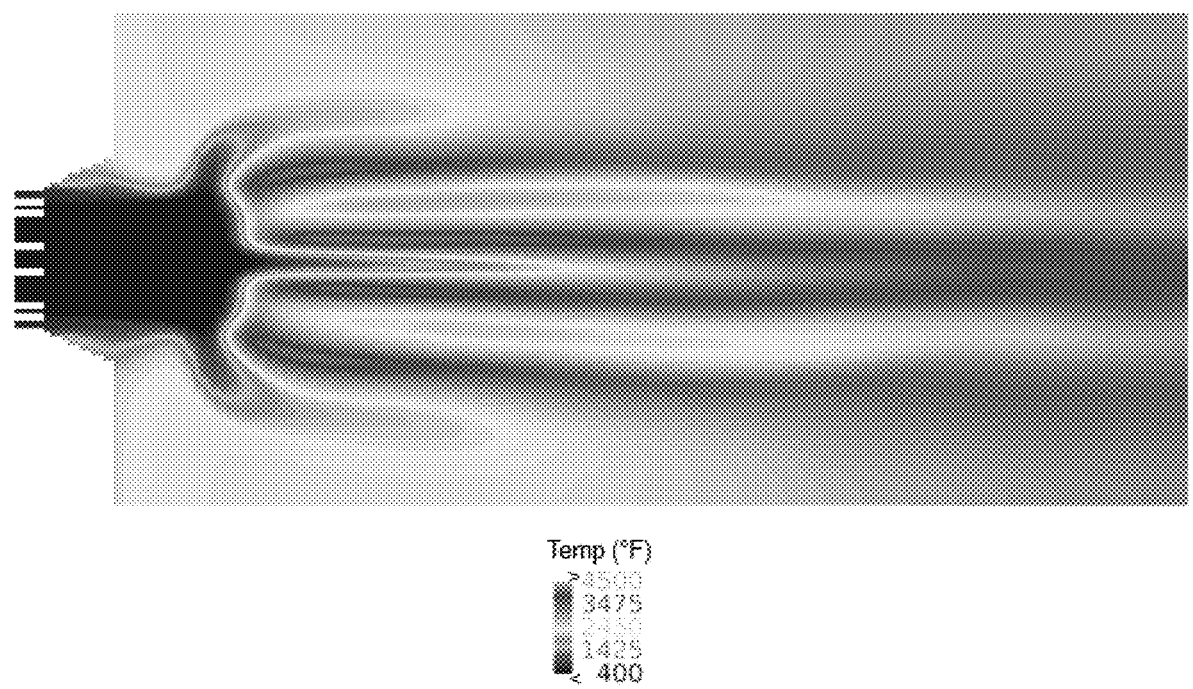
FIG. 6 shows the gas temperature profile for the annular shroud burner with a peak temperature of 4,133° F. (2,278° C.) when firing sub-bituminous coal.
Figure 7:
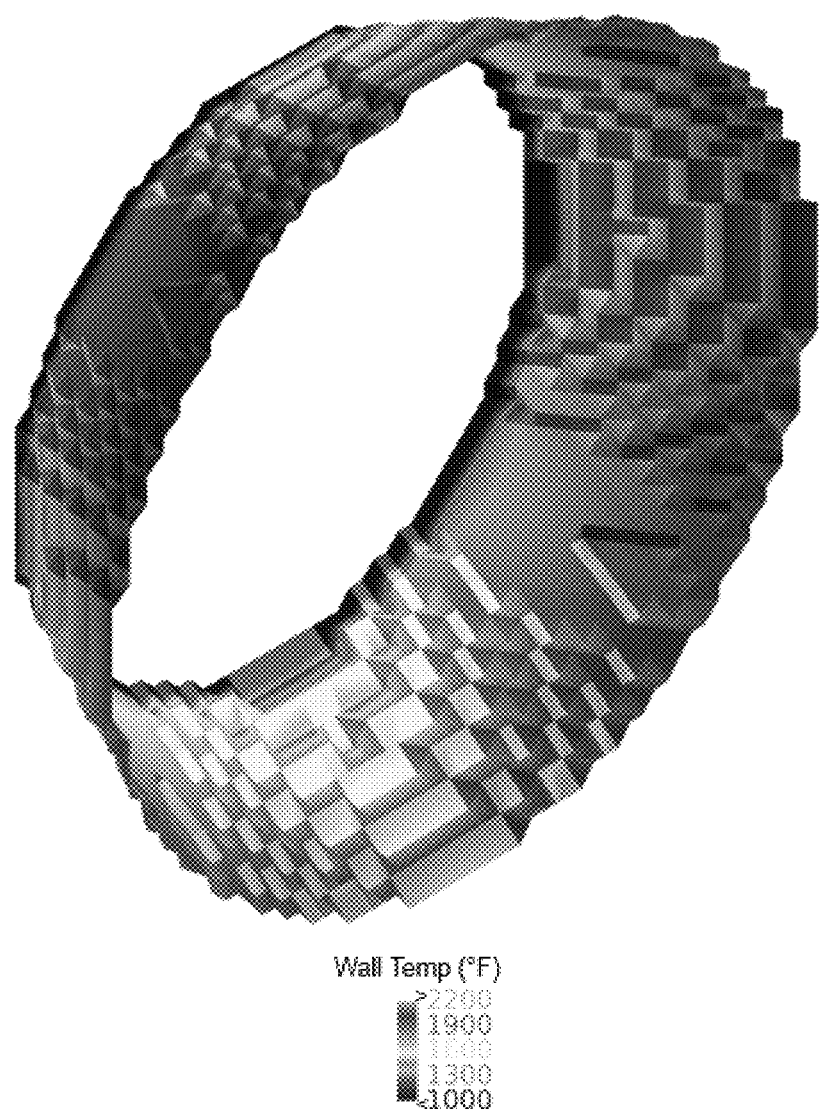
FIG. 7 shows a model of the quarl surface temperature, where the quarl is in the annular shroud burner and the burner is a single burner model.
Figure 8:
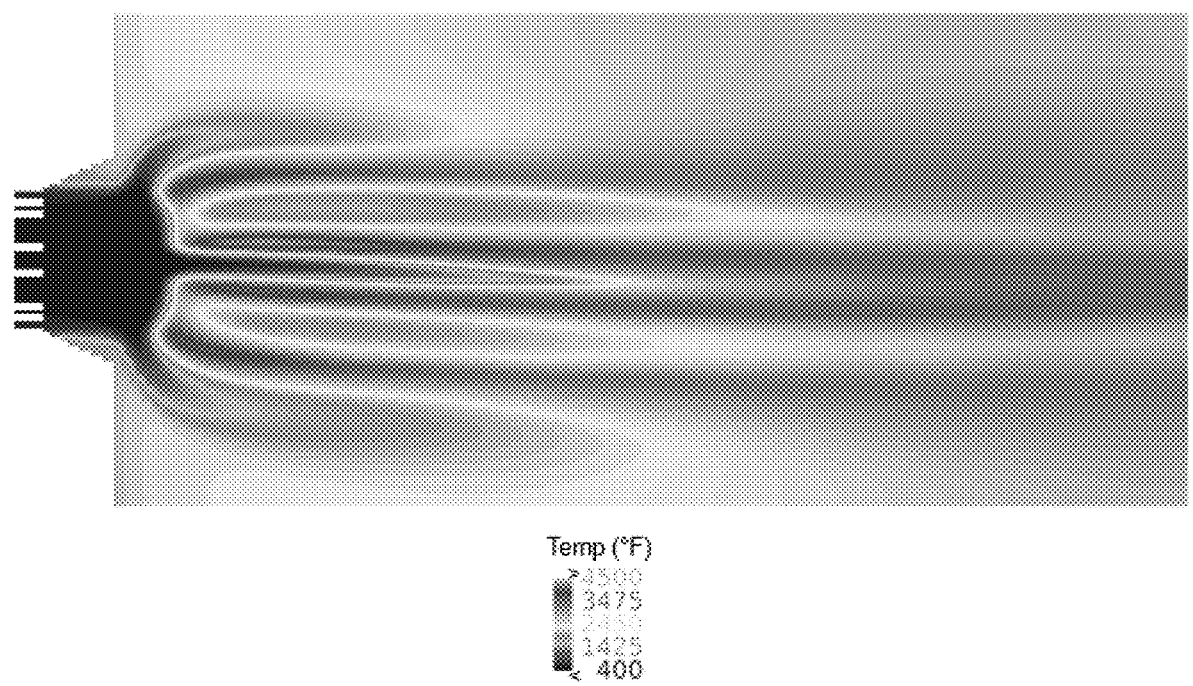
FIG. 8 shows a model of the gas temperature in a burner, where the burner is a single burner model. The turndown is 60% of a full load, but the shroud FGR flowrate was maintained and the peak temperature is 4,251° F. (2,344° C.).
Figure 9:
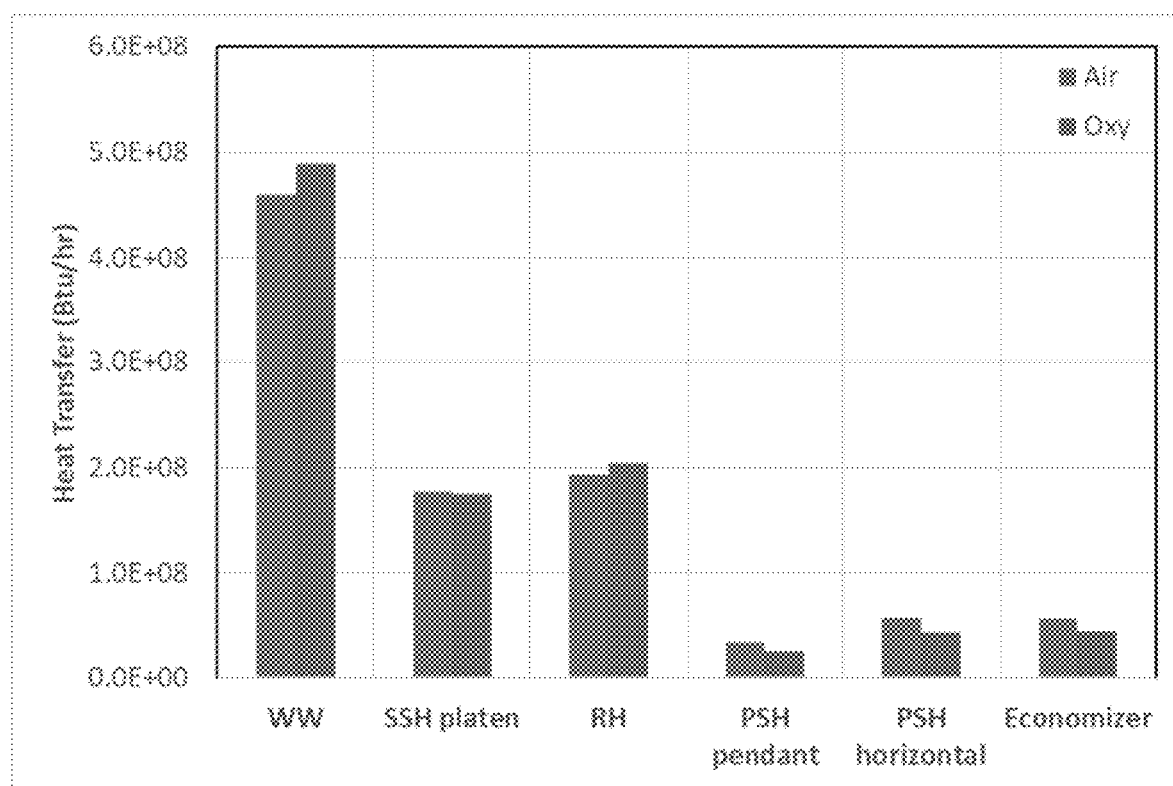
FIG. 9 shows an energy balance summary for the boiler radiant and convective sections.

FIGS. 4 and 5 show a detailed comparison of the flame shapes for the annular shroud burner (FIG. 4) and a more conventional burner (FIG. 5) with discrete ports. As seen in FIG. 4, the annular shroud burner produces an elongated heat release profile as the concentric registers of $O_2$, fuel, $O_2$, and FGR result in slower rates of mixing between the fuel and $O_2$ while the outer register of flue gas recycle creates an external envelope of relatively cool conditions. The resultant heat profile signature shows discrete bands with different flame temperatures, which depend on the source. For example, in an embodiment, the inner $O_2$ stream flame produces flame region 361, the fuel produces flame region 362, the outer $O_2$ stream produces flame region 363, and the FGR stream produces flame region 364 (the shroud). Peak flame temperature in this embodiment is 4,572° F. (2,522° C.). The temperature of the shroud 364 is significantly less, between about 2,000° F. (1,093° C.) and 3,000° F. (1,649° C.). The shroud 364 surrounds the high temperature flame regions 361, 362, and 363, thereby primarily exposing any surrounding materials only to the cooler shroud flame region 364. The exposure of such surrounding materials to high heat flux is thus greatly reduced when compared to burners currently known in the art.

In contrast, as can be seen in FIG. 5, alternating regions of high and low velocity gases at the same radial distance from the conventional burner centerline accelerate the rate of mixing in the design with discrete ports. Specifically, flame region 373 is a high temperature region which is extending radially away from the center of the flame. This radial extension increases heat flux to surrounding systems, thus increasing damage to those systems.

The experiments described herein are the first to provide heat flux data for undiluted oxygen inputs under oxy-coal combustion conditions. This has been accomplished under sufficiently well-defined conditions to allow it to be used to validate heat transfer correlations in CFD simulation codes. CFD model predictions corroborated by radiant heat flux data for select test conditions in the program suggest that aerodynamic staging using axial flames with slow mixing sufficiently extends the heat released in the furnace to avoid excessive heat fluxes to the furnace walls and burner components. It has also been found that delayed mixing and high peak flame temperatures are not necessarily mutually exclusive. In other words, heat release can be extended to distribute heat flux over larger areas of the furnace while simultaneously achieving flame temperatures that exceed 4,000° F. (2,204° C.).

Correspondingly, the approach for modeling larger scale systems includes quantification of radiant heat fluxes to establish a design suitable for the technology to be applied at scales far beyond those of the test furnaces. Sensitivity analyses have been carried out to evaluate impacts of burner design on flame behavior and the associated profiles for heat release and heat flux. Several design configurations have been simulated with varying degrees of complexity. In one case, designs are based on an axial jet burner with $O_2$-enriched motive FGR used to convey the fuel along with discrete ports to introduce $O_2$. In this system, heat fluxes to the burner and furnace walls are unacceptably high.

In contrast, as described herein, it has been found that target peak temperatures above 4,000° F. (2,204° C.) could be maintained contemporaneously with reduced heat flux by introducing non-motive supplementary FGR through the use of the novel shroud design. The supplementary FGR is introduced in the burner shroud to provide local cooling and prevent burner surface temperatures from exceeding tolerable limits. The annulus is sized to achieve a relatively low velocity stream that would keep the recycled gas close to the burner and absorb heat radiated from adjacent hot spots.

In embodiments, the peak flame temperature is in the range from about 4,000° F. (2,204° C.) to about 5,000° F. (2,760° C.), about 4,100° F. (2,260° C.) to about 4,900° F. (2,704° C.), about 4,200° F. (2,316° C.) to about 4,800° F. (2,649° C.), 4,300° F. (2,371° C.) to about 4,700° F. (2,593° C.), or about 4,400° F. (2,427° C.) to about 4,600° F. (2,538° C.). In other embodiments, the peak flame temperature is in the range from about 4,000° F. (2,204° C.) to about 4,100° F. (2,260° C.), about 4,100° F. (2,260° C.) to about 4,200° F. (2,316° C.), about 4,200° F. (2,316° C.) to about 4,300° F. (2,371° C.), about 4,300° F. (2,371° C.) to about 4,400° F. (2,427° C.), about 4,400° F. (2,427° C.) to about 4,500° F. (2,482° C.), about 4,500° F. (2,482° C.) to about 4,600° F. (2,538° C.), about 4,600° F. (2,538° C.) to about 4,700° F. (2,593° C.), about 4,700° F. (2,593° C.) to about 4,800° F. (2,649° C.), about 4,800° F. (2,649° C.) to about 4,900° F. (2,704° C.), about 4,900° F. (2,704° C.) to about 5,000° F. (2,760° C.). In other embodiments, the peak flame temperature is at least about 4,000° F. (2,204° C.), at least about 4,100° F. (2,260° C.), at least about 4,200° F. (2,316° C.), at least about 4,300° F. (2,371° C.), at least about 4,400° F. (2,427° C.), at least about 4,500° F. (2,482° C.), at least about 4,600° F. (2,538° C.), at least about 4,700° F. (2,593° C.), at least about 4,800° F. (2,649° C.), or at least about 4,900° F. (2,704° C.). In some embodiments, the peak flame temperature is about 4,000° F. (2,204° C.), about 4,050° F. (2,232° C.), about 4,100° F. (2,260° C.), about 4,150° F. (2,288° C.), about 4,200° F. (2,316° C.), about 4,250° F. (2,343° C.), about 4,300° F. (2,371° C.), about 4,350° F. (2,399° C.), about 4,400° F. (2,204° C.), about 4,450° F. (2,454° C.), about 4,500° F. (2,482° C.), about 4,550° F. (2,510° C.), about 4,600° F. (2,538° C.), about 4,650° F. (2,566° C.), about 4,700° F. (2,593° C.), about 4,750° F. (2,621° C.), about 4,800° F. (2,649° C.), about 4,850° F. (2,677° C.), about 4,900° F. (2,704° C.), about 4,950° F. (2,732° C.), or about 5,000° F. (2,760° C.). In an embodiment, the peak flame temperature is about 4,572° F. (2,522° C.), 4,581° F. (2,527° C.), 4,133° F. (2,278° C.), 4,251° F. (2,344° C.), or 4,033° F. (2,223° C.).

c. Physical Characteristics of the Annular Shroud Burner

As disclosed herein is an annular shroud burner configured in the dimensions and composition suitable for use in the system which it is employed. The following dimensions and compositions are provided merely as examples and are not intended to be limiting for the annular shroud burner as disclosed herein.

The igniter 315 has an outer diameter from about 2 to about 6 inches. In an embodiment, the igniter has an outer diameter of about 4 inches.

The $O_2$ inner annulus 301 has an inner diameter and an outer diameter. In embodiments, the inner diameter is in a range from about 4 to about 6 inches and the outer diameter is in a range from about 5 to about 7 inches, provided that the outer diameter is larger than the inner diameter. In embodiments, the inner diameter is about 5 or 5.3 inches and the outer diameter is about 6 or 6.3 inches.

The fuel annulus 302 has an inner diameter and an outer diameter. In embodiments, the inner diameter is in a range from about 10 to about 15 inches and the outer diameter is in a range from about 12 to about 17 inches, provided that the outer diameter is larger than the inner diameter. In embodiments, the inner diameter is about 13, 13.5, 13.6 or 14 inches and the outer diameter is about 14, 14.5, 14.6, or 15 inches.

The $O_2$ outer annulus 303 has an inner diameter and an outer diameter. In embodiments, the inner diameter is in a range from about 15 to about 19 inches and the outer diameter is in a range from about 16 to about 20 inches, provided that the outer diameter is larger than the inner diameter. In embodiments, the inner diameter is about 17 inches and the outer diameter is about 18 inches.

The FGR annulus 304 has an inner diameter and an outer diameter. In embodiments, the inner diameter is in a range from about 18 to about 22 inches and the outer diameter is in a range from about 19 to about 23 inches, provided that the outer diameter is larger than the inner diameter. In embodiments, the inner diameter is about 20 inches and the outer diameter is about 21 inches.

In any of the above embodiments, the sizes of the igniter and annulus follow the order from smallest diameter to largest diameter of igniter 315<$O_2$ inner annulus 301<fuel annulus 302<$O_2$ outer annulus 303<annulus 304.

In embodiments, the annular shroud burner has a specified length. The length may be configured in the dimensions suitable for use in the system which it is employed.

A relationship exists between the size of the burner and the flow rate of fuel, $O_2$ stream, and FGR. Specifically, the higher the fuel flow rate, the larger the burner.

In embodiments, the annular shroud burner is fabricated from materials suitable for use in the system in which it is employed. In an embodiment, the annular shroud burner may be fabricated from stainless steel. Stainless steel is commonly classified according to a standard alloy numbering system for steel grades maintained by SAE International. The stainless steel grades are separated into separate series, where the series include the 100 series, 200 series, 300 series, 400 series, 500 series, 600 series, and 900 series. Within each series are specified variations, called types of stainless steel. For example, in the 200 series there are types 201, 202, 205, 253, and 254. Non-limiting examples of suitable stainless steel include types 253, 309, and 310.

In embodiments, the dimensions of the annular shroud burner are modified in order to obtain desired properties, such as flame characteristics, firing rate, velocities or flow rates that can vary with fuel type and heating value. In an embodiment, variations in the size of the annular shroud burner can vary based on firing rate of the burner, fuel type and heating value.

As disclosed herein, in an embodiment, is an annular shroud burner having a quadruple concentric burner design wherein the design comprises a first, second, third, and fourth conduit wherein each conduit separately injects a first, second, third, and fourth flows into a first, second, third, and fourth annulus, wherein the first flow comprises a first source of oxygen,
the second flow comprises a mixture of fuel and a carrier,
the third flow comprises a second source of oxygen,
the fourth flow comprises FGR,
wherein at the center of the annular shroud burner there is an igniter, and
positioned outside the fourth annulus is a quarl.

As in any above embodiment, an annular shroud burner wherein the first and second sources of oxygen are undiluted sources of oxygen.

As in any above embodiment, an annular shroud burner wherein the first and second sources of oxygen have an oxygen content of at least about 90%.

As in any above embodiment, an annular shroud burner wherein the carrier is FGR.

As in any above embodiment, an annular shroud burner wherein the shroud cooling design minimizes damage to burner components and near burner furnace surfaces when compared to traditional burner configurations.

As in any above embodiment, an annular shroud burner wherein the annular shroud burner is made from stainless steel.

As in any above embodiment, an annular shroud burner wherein the steel is a 200 or 300 series type stainless steel.

As in any above embodiment, an annular shroud burner further comprising a combustion zone at the face of the annular shroud burner.

As in any above embodiment, an annular shroud burner wherein the peak flame temperature is at least 4,000° F. (2,204° C.). In a further embodiment, an annular shroud burner wherein the peak flame temperature is at least about 4,300° F. (2,371° C.).

As in any above embodiment, an annular shroud burner wherein the annular shroud burner has a heat profile signature as depicted in FIG. 4. In a further embodiment, the heat profile signature has an outer, cooler layer. In a further embodiment, the heat profile signature has one, two, or more high temperature areas surrounded by a cooler area. In a further embodiment, there are two high temperature areas surrounded by a cooler area.

As in any above embodiment, an annular shroud burner wherein the fuel conduit comprises at least one fuel selected from the group consisting of natural gas, hydrogen, refinery off gas, refinery fuel gas, blast furnace gas, propane, fuel oils, anthracite, bituminous, sub-bituminous, and lignite coals, tar, bitumen, petroleum coke, paper mill sludge solids and sewage sludge solids, wood, peat, and grass. In a further embodiment, the fuel is selected from the group consisting of bituminous, sub-bituminous, and lignite coals.

As in any above embodiment, an annular shroud burner wherein the dimensions of the burner are sufficient to achieve a flow rate for the fuel in the range from about 20 ft/s to about 150 ft/s.

d. Methods of Using the Annular Shroud Burner

In one aspect, disclosed is a method for combusting fuel using an annular shroud burner as described herein. Variations in flow rates, fuel mixtures, oxygen content, fuel type, and many other variables are disclosed herein and are not to be considered limiting.

In a further embodiment, the method for combusting fuel comprises the steps of:

providing an annular shroud burner,
supplying a first $O_2$ stream through a first conduit to a first annulus,
supplying a mixture of fuel and carrier through a second conduit to a second annulus,
supplying a second $O_2$ stream through a third conduit to a third annulus,
supplying FGR through a fourth conduit to a fourth annulus, and
igniting the flame using an igniter located at the center of the annular shroud burner.

In an embodiment, the method further comprises the steps of controlling the flow rate of the $O_2$ streams such that the flow rate is in the range from about 25 ft/s to about 125 ft/s, and controlling the flow rate of the primary fuel such that the flow rate is in the range from about 20 ft/s to about 150 ft/s.

As in any embodiment above, the method which produces a peak flame temperature of at least about 4,000° F. (2,204° C.).

As in any embodiment above, the method which produces a peak flame temperature of at least about 4,300° F. (2,371° C.).

As in any embodiment above, the method wherein the flame has a heat profile signature as depicted in FIG. 4.

C. The Combustion and Recycling System

The annular shroud burner described herein may be incorporated into a boiler unit which may further be part of a technical system, such as a fossil fuel power generation plant. In an embodiment, the annular shroud burner design provides a heat release profile in a conventional front-wall fired steam boiler configuration that substantially reduces the maximum incident heat flux on the burner components and to the furnace front walls. The annular shroud burner further regulates the amount of FGR distributed into the combustion zone to prevent damage to burner components and near-burner surfaces from extreme temperatures and heat fluxes while minimizing the impact on the peak flame temperature.

Advantages associated with a system comprising the annular shroud burner described herein include: a much higher flame temperature than conventional air/fuel and other patented oxy/fuel systems; a more directed heat release profile with less radiant heat; a novel shroud cooling design to eliminate damage to components surrounding the burner and near burner furnace surfaces; and easy replacement of pre-existing air-combustion burners with the annular shroud burner.

Figure 10:
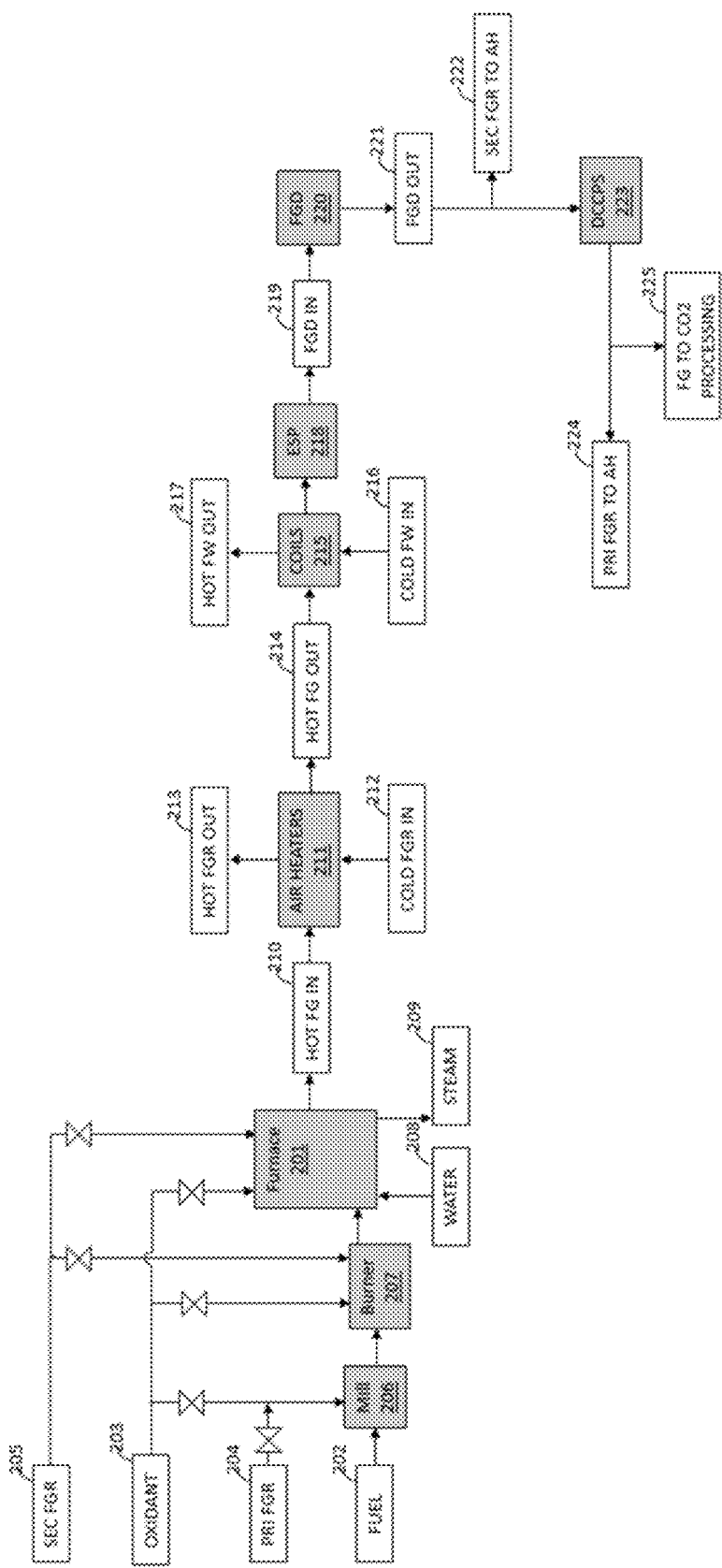
FIG. 10 shows a process flow diagram of the high flame temperature oxy-combustion system firing coal.
Figure 11:
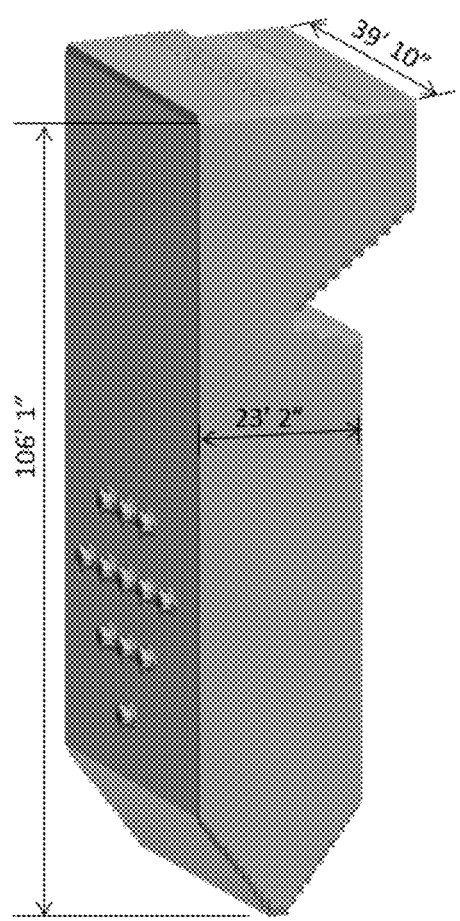
FIG. 11 shows the burner layout and geometry of a burner unit for a single wall fired sub-critical boiler.
Figure 12:
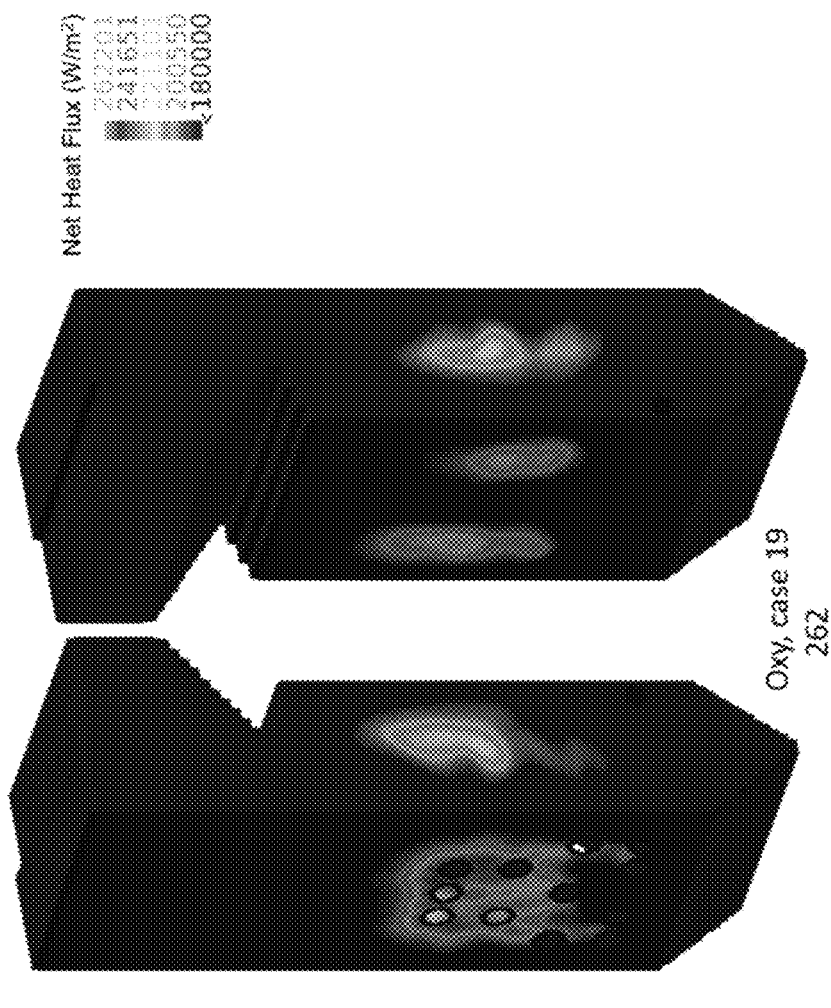
FIG. 12 shows the net heat flux for a single wall fired sub-critical boiler.
Figure 13:
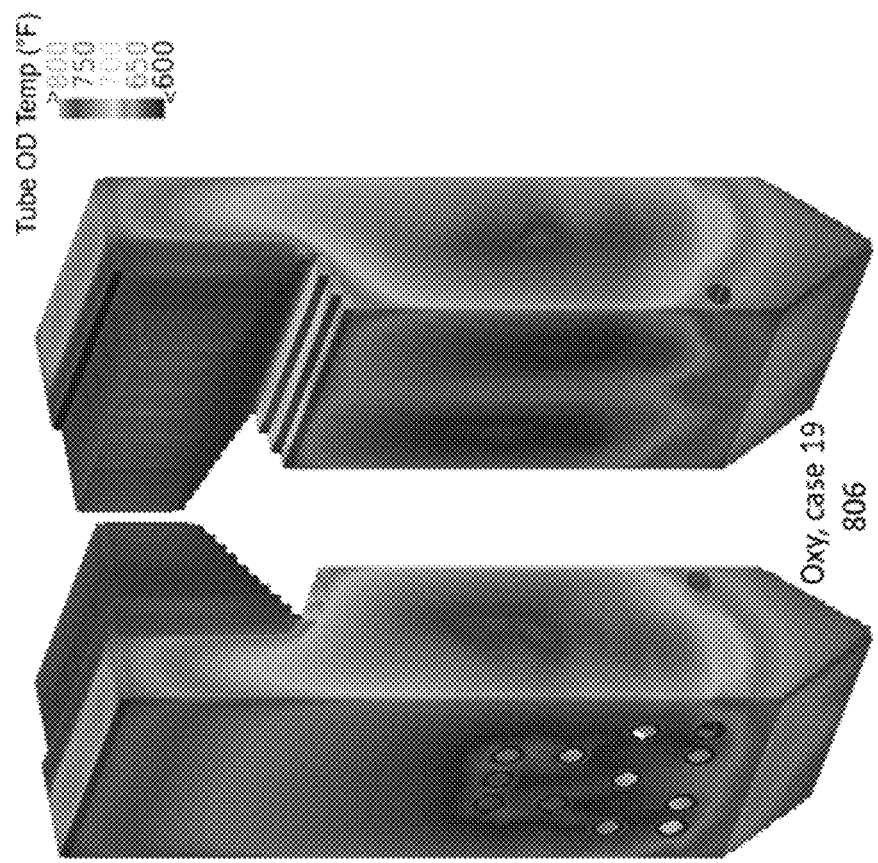
FIG. 13 shows the tube OD surface temperature for a single wall fired sub-critical boiler.
Figure 13:
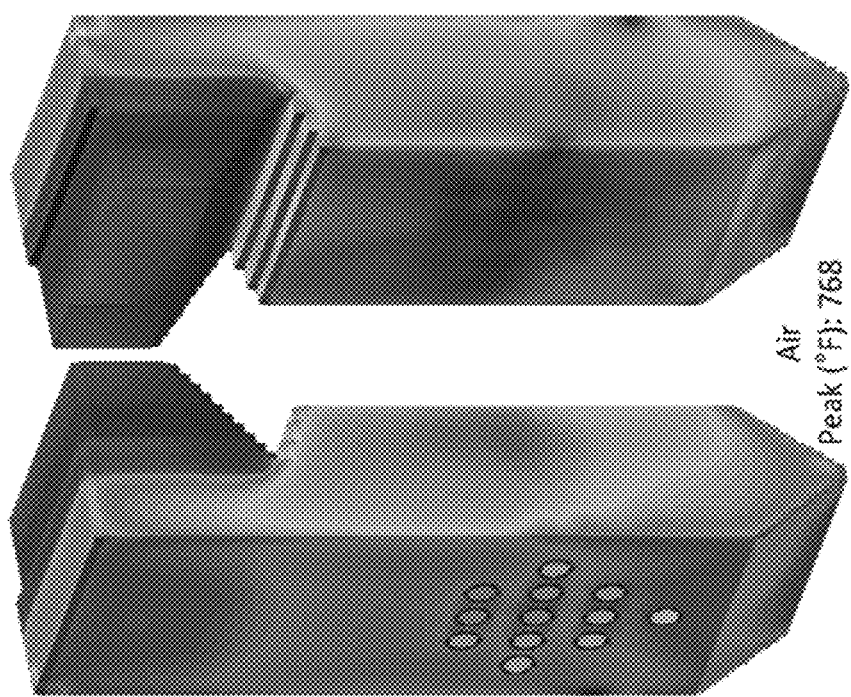
Figure 14:
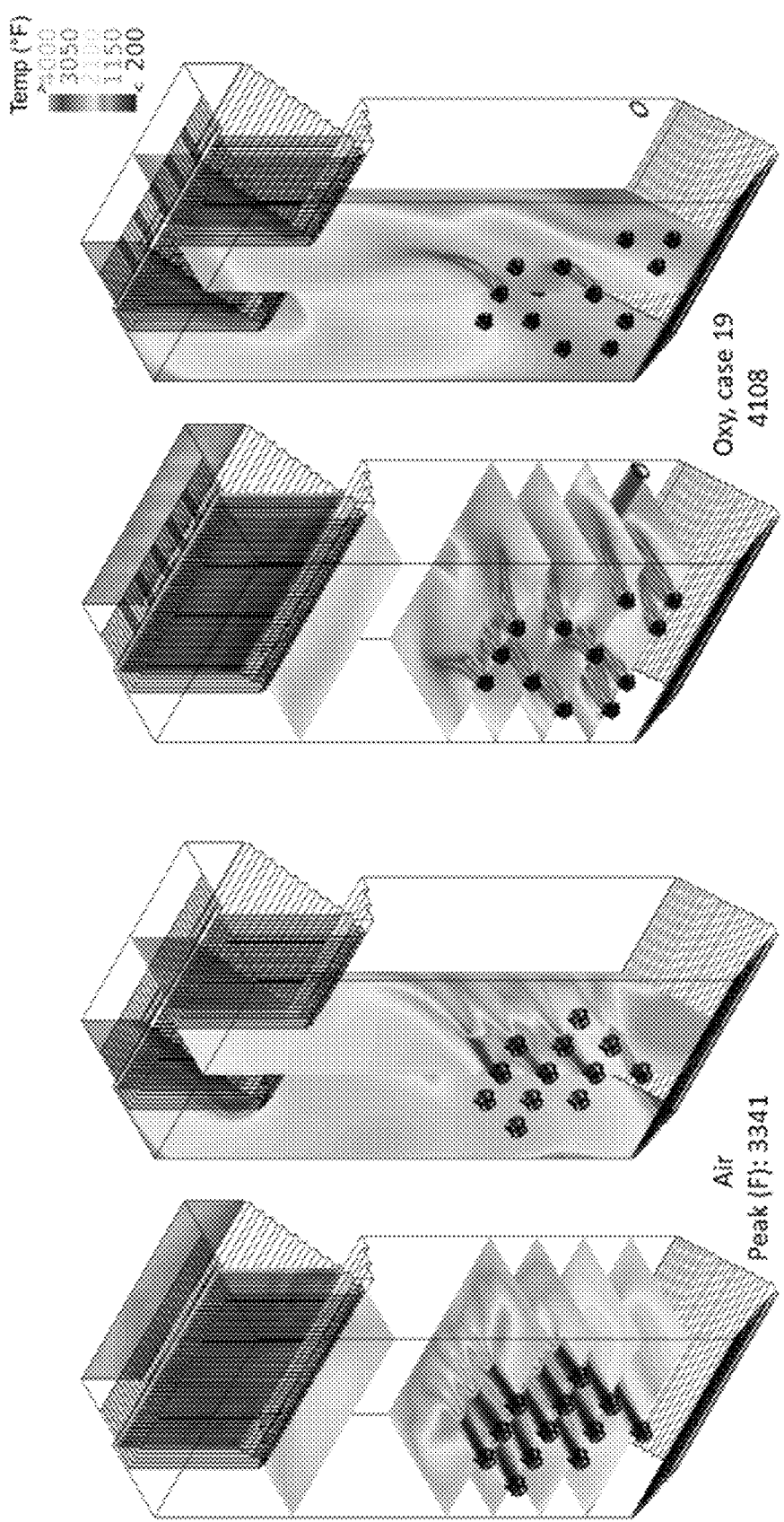
FIG. 14 shows the gas temperature for a single wall fired sub-critical boiler.
Figure 15:
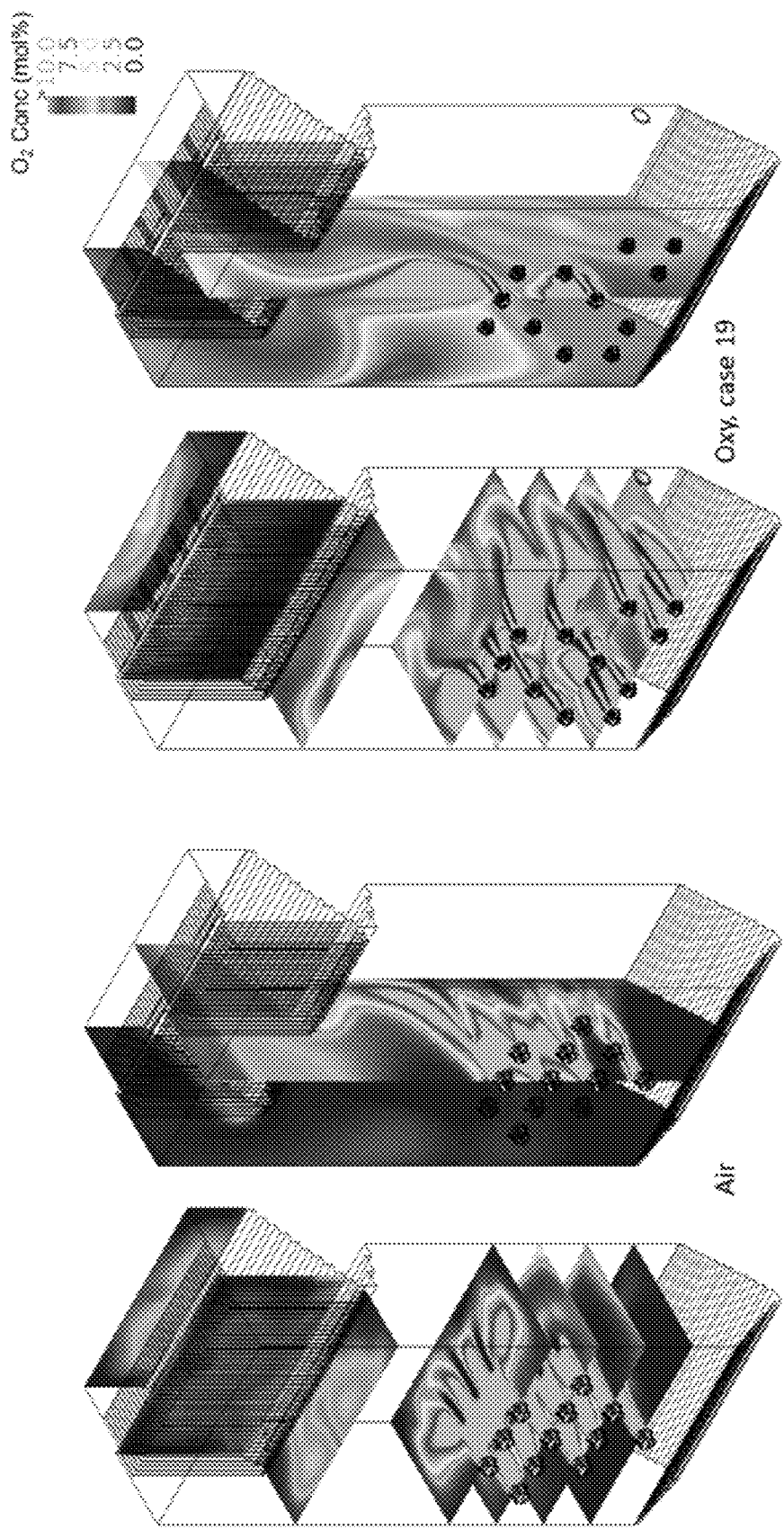
FIG. 15 shows the $O_2$ concentration for a single wall fired sub-critical boiler.
Figure 16:
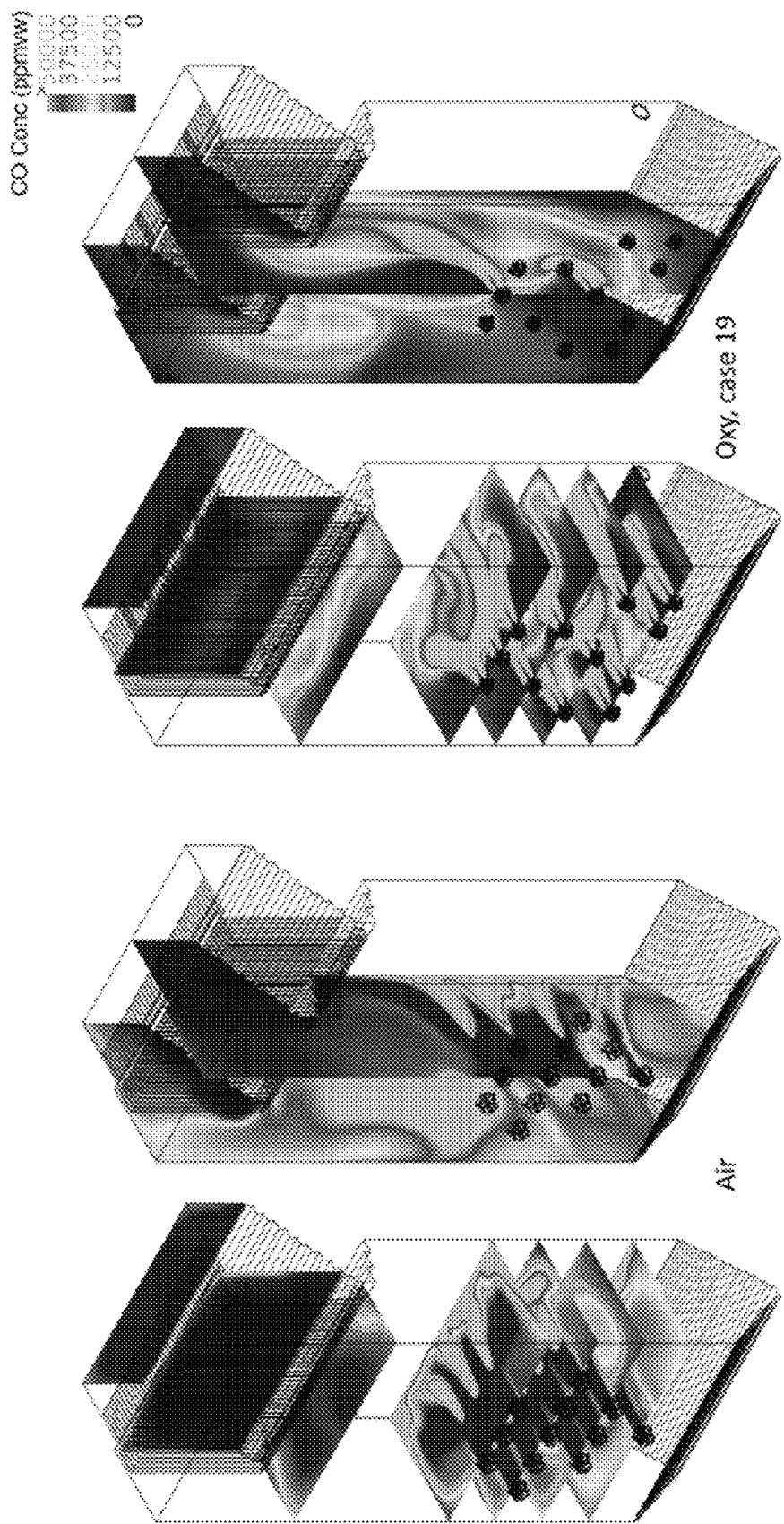
FIG. 16 shows the CO concentration for a single wall fired sub-critical boiler.
Figure 17:
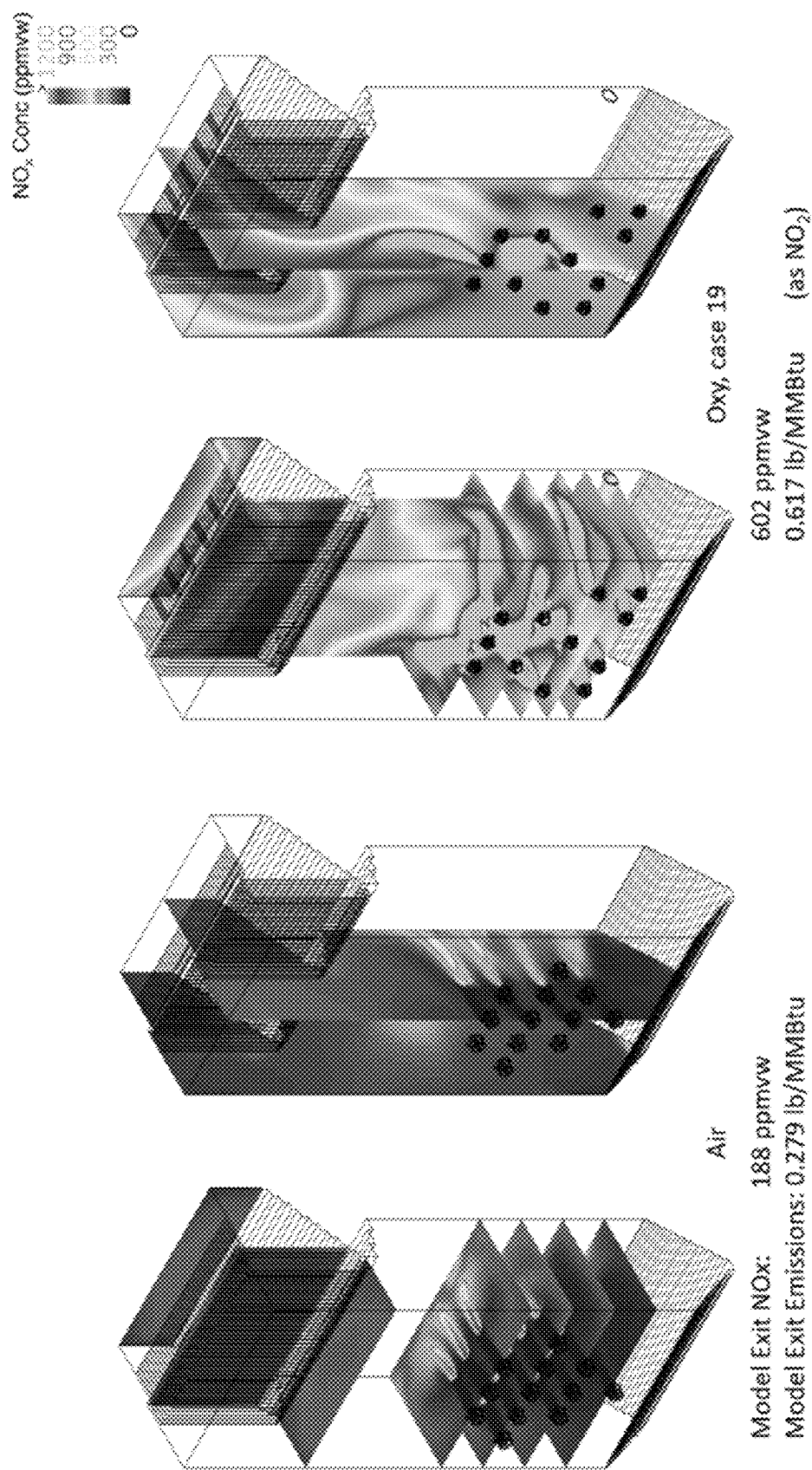
FIG. 17 shows the $NO_x$ concentration where the $NO_x$ values are uncontrolled (no $NO_x$ removal in the entire system) for a single wall fired sub-critical boiler.
Figure 18:
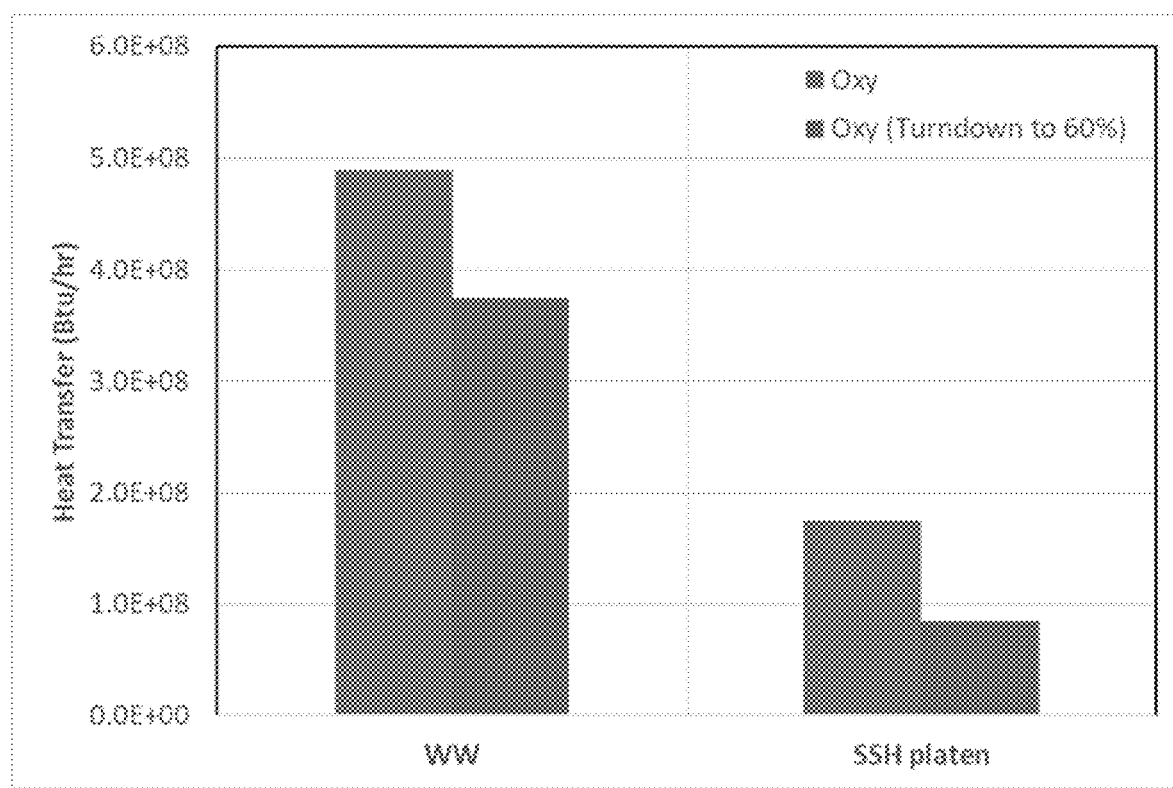
FIG. 18 shows the net heat flux following turndown.

Depicted in FIG. 10 is a process flow schematic of an embodiment of a single wall fired sub-critical boiler plant which comprises the annular shroud burner disclosed herein. As seen in FIG. 10, the fuel 202 flows through mill 206 into annular shroud burner 207, which is connected to furnace 201. Water 208 flows into furnace 201 and flows out as steam 209.

Additional components may also flow into the burner. For example, primary FGR (PRI FGR) 204 may flow into the mill 206 where it is mixed with fuel 202 prior to being introduced to burner 207. Oxidant 203 (which may be substantially pure oxygen) may flow along several different paths. In one embodiment, oxidant 203 flows into mill 206 where it may mix with fuel 202 and/or PRI FGR 204 prior to being introduced to burner 207. Oxidant 203 may also flow into burner 207 or furnace 201. An alternate source of FGR may also be present, termed secondary FGR (SEC FGR) 205. The SEC FGR 205 may flow into burner 207 and/or furnace 208.

From the furnace, there are at least two output streams, steam 209 and hot flue gas (FG) 210. The steam 209 flows out of the furnace to other parts of the system, such as a turbine/generator set which are not described here, that function to provide power generation. One other possible output stream, hot FG 210 flows into air heater 211. In one capacity, cold FG 212 flows into air heater 211, which heats the cold FG 212 and provides hot FG 213. In another capacity, air heater 211 provides an output of hot FG 214, which flows into coils 215.

Coils 215 may receive cold feed water (FW) 216, heat the water, and provide hot FW 217 as a result. The flow may continue from coils 215 to electrostatic precipitator (ESP) 218, to flue gas desulfurization (FGD) 220. Following flue gas desulfurization, the FGD out 221 may flow as either secondary FGR 222 to the air heater (AH) or flow into a Direct Contact Cooler Polishing Scrubber (DCCPS) 223. From DCCPS 223, the FGR may flow as primary FGR 224 to the air heater or flow as FG for $CO_2$ processing 225.

Because the annular shroud burner produces a high flame temperature, the heat transfer in the overall system is very efficient. Additional modifications to the overall system may further increase this efficiency. Such modifications include changes to the geometry of the boiler (e.g., direct flame exposure of the boiler tubes) which further increases the heat transfer by maximizing the metal surface area over which heat transfer from the flame to the metal occurs. As a result, the boilers used may be physically smaller than a conventional boiler with a conventional burner.

Further disclosed in FIGS. 11-18 are results from models of the annular shroud burner operated within a single wall fired sub-critical boiler system.

In an embodiment, as disclosed herein is a high flame temperature oxy-combustion system, comprising:

at least one annular shroud burner, a furnace for combusting, an air separation unit, at least one conduit, and a control system, wherein the annular shroud burner is configured to provide a peak flame temperature of at least 4,000° F. (2,204° C.) with a heat profile signature similar to that depicted in FIG. 4, such that the radiant heat and potential damage to systems surrounding the annular shroud burner is minimized.

In an embodiment, as disclosed herein is a method of operating an oxy-combustion system, wherein the method comprises:

supplying a fuel, carrier, and substantially pure oxygen to the annular shroud burner, burning the fuel, carrier, and substantially pure oxygen to issue a flame, wherein the flame has a radiant heat profile signature similar to that depicted in FIG. 4, heating water in the boiler with the high flame temperature oxy-combustion annular shroud burner to convert water into steam.

D. Examples

The following preparations and examples are given to enable those skilled in the art to more clearly understand and to practice the present invention. They should not be considered as limiting the scope of the invention, but merely as being illustrative and representative.

Example 1: Comparison of Air and Oxy-Fired Combustion

|  | Air-fired |
|---|---|
| Gross MW | 112.0 |
| Net MW | 105.67 |
| Firing rate (thermal input HHV), MMBtu/hr | 1138.6 |
| Net Heat Rate, Btu/kWh | 10775 |
| Coal Flow, lb/hr | 140302 |
| Total Air Flow, lb/hr | 936690 |
| Overall Stoichiometric Ratio | 1.1036 |
| Excess O2 in FG at furnace exit, vol % wet | 1.72 |
| Excess O2 in FG at furnace exit, vol % dry | 2.0 |
| FG econ outlet temp (AH inlet), F. | 688 |
| AH outlet FG temp, F. | 283 |
| Atmospheric pressure, psia | 12.1 |
| Burners in operation | 12 |
| Mills in service | 8, 10, 11, 12 |
| Primary Gas/Coal | 1.95 |
| Primary Gas Flow, lb/hr | 273590 |
| Primary gas temperature entering mill, F. | 582 |
| Primary Temperature entering boiler, F. | 135 |
| Coal moisture vaporized in mill, % | 60 |

| | |
|---|---|
| Secondary Temperature entering boiler, F. | 580 |

| | Oxy-fired |
|---|---|
| Firing rate (thermal input HHV), MMBtu/hr | 1138.6 |
| Coal Flow, lb/hr | 140302 |
| Total O₂ Flow, lb/hr | 205967 |
| Total FGR Flow, lb/hr | 525847 |
| Secondary FGR Flow, lb/hr, external to burner | 301975 (57.4% of total FGR) |
| Shroud FGR Flow, lb/hr | 27359 (5.2% of total FGR) |
| Overall Stoichiometric Ratio | 1.054 |
| Excess O2 in FG at furnace exit, vol % wet | 1.31 |
| Excess O2 in FG at furnace exit, vol % dry | 1.94 |
| Atmospheric pressure, psia | 12.1 |
| Burners in operation | 12 |
| Mills in service | 7, 8, 5, 12 |
| Primary Gas/Coal | 1.75 (1.68 air eq, 4500 ft/min coal pipe) |
| Primary Gas Flow, lb/hr | 245529 |
| Primary FGR Flow, lb/hr | 1.96513 (37.4% of total FGR) |
| Primary O2 Flow, lb/hr | 49016 |
| Primary Gas O2 concentration, % | 23.5 |
| Primary gas temperature entering mill, F. | 545 |
| Primary Temperature entering boiler, F. | 134 |
| Coal moisture vaporized in mill, % | 45 |
| Secondary O₂ Temperature entering boiler, F. | 68 |
| Secondary FGR Temperature entering boiler, F. | 645 |
| FG Recycle Rate, mass % of furnace exit FG flow | 61 |
| Overall O2 in O2/FGR mix, % | 30.6 |

The following steam conditions were used to set tuning parameters in the air-fired SGE process modeling. Once set, the parameters were held constant to predict steam conditions during oxy-firing.

| | Air-fired |
|---|---|
| SH flow, lb/hr | 752646 |
| SH final pressure, psig | 1449 |
| SH final temp, F. | 1004 |
| SH spray, lb/hr | 23881 |
| Primary SH outlet temp, F. | 706 |
| Drum Pressure, psig | 1615 |
| Saturation temp, F. | 607 |
| Econ out temp, F. | 537 |
| FW temp to economizer, F. | 471 |
| Econ inlet and spray pressure, psig | 1826 |
| RH flow, lb/hr | 671539 |
| RH final pressure, psig | 472 |
| RH final temp, F. | 1000 |
| RH spray, lb/hr | 86732 |
| RH inlet temp, F. | 731 |
| RH inlet pressure, psig | 513 |
| Spray temp, F. | 303 |

The overall results comparing the air-fired and oxy-fired burners.

| | Air-fired CFD | Oxy-fired CFD |
|---|---|---|
| FEGT (° F.) | 1724 | 1693 |
| Peak Gas Temp in Domain (° F.) | 3341 | 4108 |
| CO at Furnace Exit (ppmv, wet) | 2181 | 5314 |
| O₂ at Furnace Exit (vol %, wet) | 2.16 | 2.51 |
| Peak Net Heat Flux (kW/m²) | 210 | 262 |
| Average Net Heat Flux, All surfaces (kW/m²) | 60.0 | 60.7 |
| Average Net Heat Flux, Surfaces below nose (kW/m²) | 115.9 | 125.0 |
| Peak incident Heat Flux (kW/m²) | 406 | 507 |
| Peak Tube OD Temp (° F.) | 768 | 806 |
| Burnout (%) | 99.15 | 99.44 |
| Carbon in Ash (%) | 5.6 | <0.1 |
| Ash Carryover (%) | 93.7 | 97.6 |

| | Air-fired CFD | Oxy-fired CFD |
|---|---|---|
| NOx at economizer exit (ppmv, wet) | 188 | 602 |
| NOx at economizer exit (lb/MMBtu) | 0.28 | 0.62 |
| NOx emissions at stack/CPU inlet (ppmv, wet)[1] | 180 | 713 |
| NOx emissions at stack/CPU inlet (lb/MMBtu)[1] | 0.28 | 0.24 |

* Furnace Exit is between SSH platen and RH pendant
[1] From process modeling

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. An oxy-combustion system, comprising:
a furnace;
an oxy-combustion burner connected to the furnace;
a mill configured to receive a fuel and to provide the fuel to the oxy-combustion burner;
an air heater configured to receive a first flue gas from the furnace and to exhaust the first flue gas as a second flue gas;
a heat exchanger configured to receive a cold feed water, the heat exchanger system further configured to heat the cold feed water via the second flue gas to produce a hot feed water and to exhaust the second flue gas as a third flue gas;
an electrostatic precipitator configured to receive the third flue gas and to exhaust the third flue gas as a fourth flue gas; and
a direct contact cooler polishing scrubber configured to receive the fourth flue gas and to exhaust the fourth flue gas as a cooled flue gas, the cooled flue gas providing a first cooled flue gas recycle supply stream configured to supply the cooled flue gas to the air heater.

2. The oxy-combustion system of claim 1, further comprising a flue gas desulfurizer in fluid communication with the electrostatic precipitator and the direct contact cooler polishing scrubber.

3. The oxy-combustion system of claim 2, wherein the air heater is configured to heat the first cooled flue gas recycle supply stream to produce a heated flue gas recycle supply stream.

4. The oxy-combustion system of claim 3, wherein the heated flue gas recycle supply stream is configured to be provided to the mill as a primary flue gas recycle stream.

5. The oxy-combustion system of claim 4, wherein the cooled flue gas provides a second cooled flue gas recycle supply stream configured for $CO_2$ processing.

6. The oxy-combustion system of claim 1, wherein the oxy-combustion burner is an annular shroud burner, comprising:
a quarl, the quarl having a diverging conical shape that is positioned to extend along a central axis and defining a combustion zone radially inward and downstream of a radially inner surface of the quarl, the quarl extending from a burner face to a furnace interior wall;
a first conduit, the first conduit positioned to extend along the central axis and configured to provide a first stream of oxygen into the combustion zone at the burner face;
a second conduit, the second conduit positioned to extend along the central axis, radially outward of the first conduit, and configured to provide a mixed stream of a fuel and a carrier to the combustion zone at the burner face;
a third conduit, the third conduit positioned to extend along the central axis, radially outward of the second conduit, and configured to provide a second stream of oxygen to the combustion zone at the burner face; and
a fourth conduit, the fourth conduit positioned to extend along the central axis, radially outward of the third conduit, and configured to provide a stream of recycled flue gas in a form of a conical shroud that extends along the inner surface of the quarl, from the burner face to the furnace interior wall, the stream of recycled flue gas surrounding a peak flame temperature region within the combustion zone.

7. The oxy-combustion system of claim 6, wherein the first stream of oxygen and the second stream of oxygen of the annular shroud burner comprise undiluted oxygen.

8. The oxy-combustion system of claim 6, wherein the first stream of oxygen and the second stream of oxygen of the annular shroud burner comprise an oxygen content of at least about 90%.

9. The oxy-combustion system of claim 6, wherein the carrier comprises a recycled flue gas.

10. A method for generating a flue gas stream for $CO_2$ processing using a system comprising a furnace, an oxy-combustion burner, a mill configured to receive a fuel and to provide the fuel to the oxy-combustion burner, an air heater configured to receive a first flue gas from the furnace and to exhaust the first flue gas as a second flue gas, a heat exchanger configured to receive a cold feed water, the heat exchanger further configured to heat the cold feed water via the second flue gas to produce a hot feed water and to exhaust the second flue gas as a third flue gas, an electrostatic precipitator configured to receive the third flue gas and to exhaust the third flue gas as a fourth flue gas, and a direct contact cooler polishing scrubber configured to receive the fourth flue gas and to exhaust the fourth flue gas as a cooled flue gas, the cooled flue gas providing a first cooled flue gas recycle supply stream configured to supply the cooled flue gas to the air heater, the method comprising:
providing the fuel from the mill to the oxy-combustion burner;
providing the first flue gas from the furnace to the air heater and exhausting the first flue gas from the air heater as the second flue gas;
providing the cold feed water to the heat exchanger, heating the cold feed water via the second flue gas to produce the hot feed water and exhausting the second flue gas from the heat exchanger as the third flue gas;
providing the third flue gas to the electrostatic precipitator and exhausting the third flue gas from the electrostatic precipitator as a fourth flue gas; and
providing the fourth flue gas to the direct contact cooler polishing scrubber and exhausting the fourth flue gas from the direct contact cooler polishing scrubber as the cooled flue gas, the cooled flue gas providing
the first cooled flue gas recycle supply stream configured to supply the cooled flue gas to the air heater, and
a second cooled flue gas recycle supply stream configured for $CO_2$ processing.

11. The method of claim 10, wherein the oxy-combustion burner includes an annular shroud burner having a quarl, the quarl having a diverging conical shape that is positioned to extend along a central axis and defining a combustion zone radially inward and downstream of a radially inner surface of the quarl, the quarl extending from a burner face to a furnace interior wall, the method further comprising:
providing a first stream of oxygen into the combustion zone via a first conduit, the first conduit positioned to extend along the central axis and configured to open into the quarl at the burner face;
providing a mixed stream of the fuel and a carrier to the combustion zone via a second conduit, the second conduit positioned to extend along the central axis, radially outward of the first conduit, and configured to open into the quarl at the burner face;
providing a second stream of oxygen to the combustion zone via a third conduit, the third conduit positioned to extend along the central axis, radially outward of the second conduit, and configured to open into the quarl at the burner face; and
providing a stream of recycled flue gas, that surrounds a portion of the combustion zone, via a fourth conduit, the fourth conduit positioned to extend along the central axis, radially outward of the third conduit, and configured to provide the stream of recycled flue gas in a form of a conical shroud that extends along the inner surface of the quarl, from the burner face to the furnace interior wall, the stream of recycled flue gas surrounding a peak flame temperature area within the combustion zone.

12. The method of claim 11, wherein the first stream of oxygen and the second stream of oxygen of the annular shroud burner comprise undiluted oxygen.

13. The method of claim 11, wherein the first stream of oxygen and the second stream of oxygen of the annular shroud burner comprise an oxygen content of at least about 90%.

14. The method of claim 11, wherein the carrier comprises a recycled flue gas.

* * * * *